US007916848B2

(12) United States Patent
Rui et al.

(10) Patent No.: US 7,916,848 B2
(45) Date of Patent: Mar. 29, 2011

(54) METHODS AND SYSTEMS FOR PARTICIPANT SOURCING INDICATION IN MULTI-PARTY CONFERENCING AND FOR AUDIO SOURCE DISCRIMINATION

(75) Inventors: Yong Rui, Sammamish, WA (US); Anoop Gupta, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 1672 days.

(21) Appl. No.: 10/677,213

(22) Filed: Oct. 1, 2003

(65) Prior Publication Data
US 2005/0076081 A1 Apr. 7, 2005

(51) Int. Cl.
H04M 3/42 (2006.01)
H04M 1/64 (2006.01)
G10L 13/00 (2006.01)
(52) U.S. Cl. .............. 379/202.01; 379/88.01; 704/259
(58) Field of Classification Search ............ 379/202.01, 379/201.01, 88.01; 348/14.01, 14.09; 704/259, 704/208, 275; 345/753; 381/66
See application file for complete search history.

(56) References Cited

U.S. PATENT DOCUMENTS

| 5,347,305 | A | * | 9/1994 | Bush et al. ................ 348/14.01 |
| 5,539,741 | A | | 7/1996 | Barraclough et al. |
| 5,835,129 | A | * | 11/1998 | Kumar ...................... 348/14.09 |
| 5,907,598 | A | | 5/1999 | Mandalia et al. |
| 5,991,385 | A | | 11/1999 | Dunn et al. |
| 6,006,175 | A | * | 12/1999 | Holzrichter ................. 704/208 |
| 6,073,101 | A | | 6/2000 | Maes |
| 6,092,039 | A | | 7/2000 | Zingher |
| 6,100,882 | A | | 8/2000 | Sharman et al. |
| 6,195,694 | B1 | | 2/2001 | Chen et al. |
| 6,289,388 | B1 | * | 9/2001 | Disney et al. ................ 709/238 |
| 6,317,716 | B1 | * | 11/2001 | Braida et al. ................ 704/275 |
| 6,327,343 | B1 | | 12/2001 | Epstein et al. |
| 6,332,122 | B1 | | 12/2001 | Ortega et al. |
| 6,477,240 | B1 | | 11/2002 | Lim et al. |
| 6,477,500 | B2 | | 11/2002 | Maes |
| 6,574,599 | B1 | | 6/2003 | Lim et al. |
| 7,155,018 | B1 | * | 12/2006 | Stokes et al. ................. 381/66 |
| 7,242,755 | B2 | * | 7/2007 | Cope et al. ............ 379/202.01 |
| 7,266,189 | B1 | * | 9/2007 | Day ...................... 379/202.01 |
| 2002/0093531 | A1 | * | 7/2002 | Barile ...................... 345/753 |

(Continued)

OTHER PUBLICATIONS

Soma Mukherjee, "Median Based on Floor Tracker (MNFT): Robust Estimation of Noise Floor Drifts in LIGO S1 Data." Max Planck Institut fuer Gravitationsphysik, Am Muehlenberg 1, D-14476 Golm, Germany, Mar. 2003.

(Continued)

Primary Examiner — Rasha S Al Aubaidi
(74) Attorney, Agent, or Firm — Lee & Hayes, PLLC

(57) ABSTRACT

Indications of which participant is providing information during a multi-party conference. Each participant has equipment to display information being transferred during the conference. A sourcing signaler residing in the participant equipment provides a signal that indicates the identity of its participant when this participant is providing information to the conference. The source indicators of the other participant equipment receive the signal and cause a UI to indicate that the participant identified by the received signal is providing information (e.g. the UI can causes the identifier to change appearance). An audio discriminator is used to distinguish between an acoustic signal that was generated by a person speaking from that generated in a band-limited manner. The audio discriminator analyzes the spectrum of detected audio signals and generates several parameters from the spectrum and from past determinations to determine the source of an audio signal on a frame-by-frame basis.

37 Claims, 13 Drawing Sheets

U.S. PATENT DOCUMENTS

| | | | | |
|---|---|---|---|---|
| 2004/0158614 A1* | 8/2004 | Williams | | 709/207 |
| 2004/0260550 A1* | 12/2004 | Burges et al. | | 704/259 |
| 2007/0156910 A1* | 7/2007 | Christie et al. | | 709/227 |
| 2009/0052642 A1* | 2/2009 | Tackin et al. | | 379/93.05 |

OTHER PUBLICATIONS

Ben Juby and David De Roure; "Real-Time Speaker Identification and Participant Tracking in the Access Grid"; University of Southampton, UK; Jun. 2003.

"WebDemo Technology Overview—WebDemo ConnectionPoint"; WebDemo 2.0, pp. 1-5; Jul. 17, 2002.

"Speech Analysis Tutorial"; http://www.ling.lu.se/research/speechtutorial/tutorial.html; pp. 1-5; Speech Visualisation Tutorial, Leeds University; Dec. 11, 1995.

Felicity Cox; "SPH301 Acoustics of Speech Consonant Acoustics—The Acoustic Characteristics of Fricatives and Affricates"; http://www.ling.mq.edu.au/units/sph301/consonants/fricweb.html. Jul. 2003.

Christine H. Shadle and Sheila J. Mair; "Quantifying Spectral Characteristics of Fricatives"; University of Southampton, UK, Mar. 2000.

Minsheng Lui and Arild Lacroix; "Pole-Zero Modeling of Vocal Tract for Fricative Sounds"; Institut fuer Angewandte Physik, University of Frankfurt; Germany, Apr. 1997.

R. Alex Colburn, Michael F. Cohen, Steven M. Drucker, Scott Lee Tiernan and Anoop Gupta; "Graphical Enhancements for Voice ONly Conference Calls"; Technical Report; Microsoft Corporation; Oct. 1, 2001.

De. E. Sturim, D. A. Reynolds, E Singer and J. P. Campbell; "Speaker Indexing in Large Audio Databases Using Anchor Models"; Department of Defense under Air Force Contract F19628-11-C-0002, May 2001.

Sumit Basu, Steve Schwartz and Alex Pentland; "Wearable Phased Arrays for Sound Localization and Enhancement"; MIT Media Laboratory; pp. 1-8, Oct. 2000.

* cited by examiner

METHODS AND SYSTEMS FOR PARTICIPANT SOURCING INDICATION IN MULTI-PARTY CONFERENCING AND FOR AUDIO SOURCE DISCRIMINATION

FIELD

Various embodiments described below relate generally to multi-party conferencing and to audio signal source discrimination and, more particularly but not exclusively to, methods and apparatus for indicating the source of information in a multi-part conference and to methods and apparatus for discriminating between audio signal sources having different spectral characteristics.

BACKGROUND

Teleconferencing is a well-established method of communication between parties at different locations. Typically, the conference is held using standard telephone services and equipment to enable participants to speak to each other. A participant may use a speakerphone for greater comfort or to allow the participant to use both hands for other tasks (e.g., taking notes, handle materials being discussed in the teleconference, etc.). One of the shortcomings of traditional teleconferencing is that participants may not know which of the various participants is speaking at any given time during the teleconference. Because normal telephone service band-limits the connection, this speaker discrimination problem can be exacerbated. Even if the telephone service is not band-limited, speech transmitted over the connection (and/or emitted from a telephone speaker) has other characteristics that are different from live speech).

SUMMARY

In accordance with aspects of the various described embodiments, a method and system to indicate which participant or participants are providing information during a multi-party conference is provided. In one aspect, each participant has equipment (e.g., personal computers, personal digital assistants (PDAs) or other computing devices) to display information being transferred during the multi-party conference. In some circumstances, the identity of the participant providing the information is not apparent to the other participants.

This aspect incorporates a sourcing signaler and a source indicator in the participant equipment. The sourcing signaler provides a signal that indicates the identity of a participant providing information to the multi-party conference to be sent to the other participants. The source indicators of the other participant equipment receives the signal and in response, causes a user interface (UI) displayed by the participant equipment to provide an indication that the participant identified by the received signal is providing information. In some embodiments, the UI causes an identifier of the participant to change appearance (e.g., causing the identifier to blink or flash, animate, change color or size, etc.) in a noticeable manner so that participant viewing the UI can easily know which participant is providing the information. This aspect can be advantageously used in web conferencing applications in which participants may discuss material displayed by the UI via a teleconference. When a participant is speaking on the telephone, this aspect can cause the participant's name or other identifier to change appearance as described above.

In accordance with other aspects of the various described embodiments, a method and system to discriminate between sources of an audio signal is provided. In one of these other aspects, an audio discriminator is used to distinguish between an acoustic signal that was generated by a person speaking from an acoustic signal generated in a band-limited manner (e.g., the acoustic output signal from a speakerphone). In one example application, the audio discriminator can be incorporated in the participant equipment described above so that the sourcing signaler residing in the participant equipment can automatically detect when its participant is speaking and avoid erroneously sending the signal in response to another participant's voice coming over a speakerphone.

In one of these other aspects, the audio discriminator analyzes the spectrum of detected audio signals and generates several parameters from the spectrum and from past determinations to determine the source of an audio signal. In one implementation, a finite state machine uses these parameters to determine the source of an audio signal on a frame-by-frame basis.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
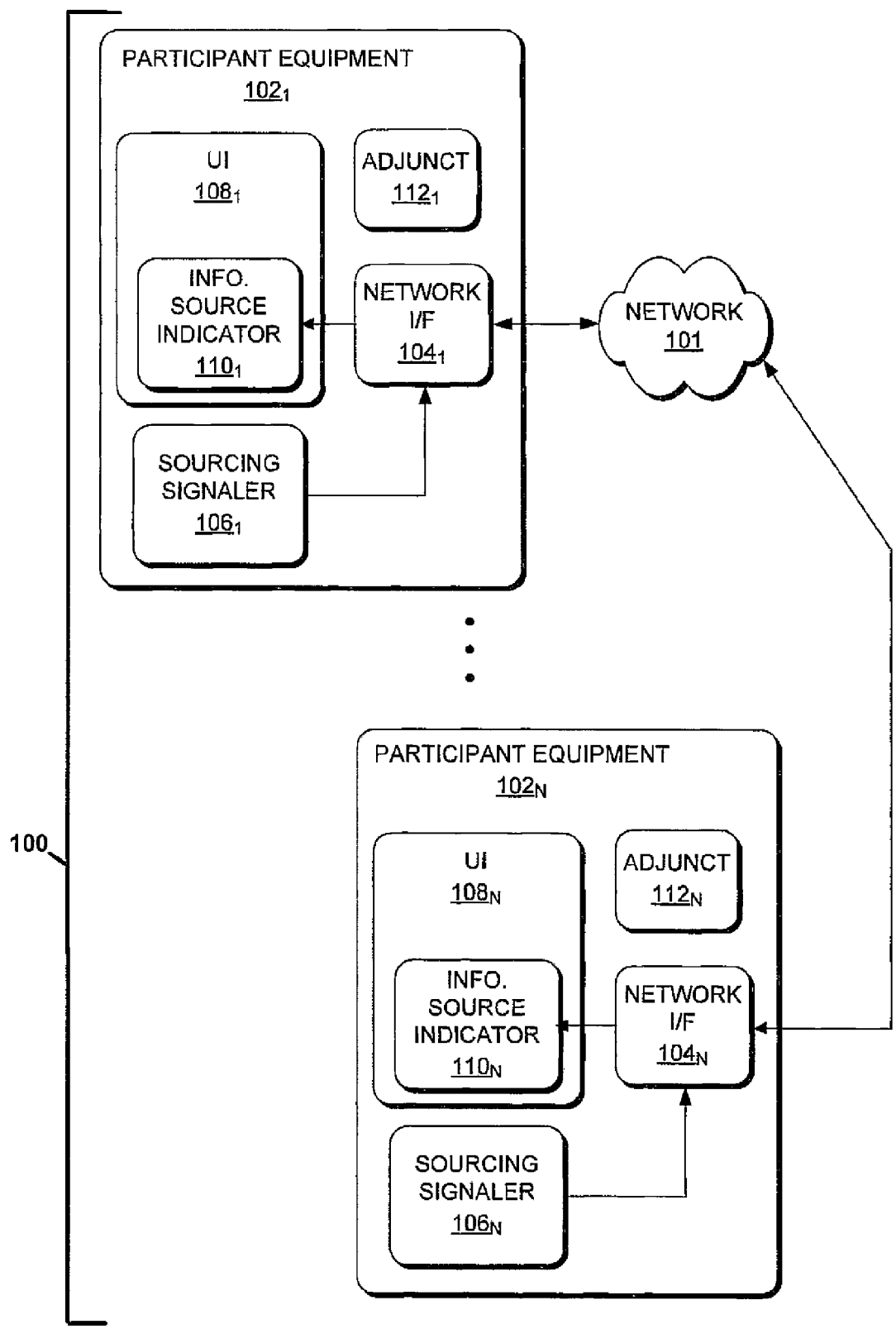
FIG. 1 is a block diagram illustrating a system for supporting multi-party conferencing with information source indication, according to one embodiment.

FIG. 1 illustrates a system 100 that supports multi-party conferencing with information source indication, according to one embodiment. In this embodiment, system 100 includes a network 101 to which N participants can communicate with each other (where N is an integer greater than two in a typical embodiment). The network can be any suitable communication network such as, for example, the Internet, a local area network (LAN), a campus area network, a virtual private network (VPN), etc. Further, the network may operate in a client-server mode or a peer-to-peer mode.

The N participants, in this embodiment, have participant equipment (PE) $102_1$ through PE $102_N$. In addition, PEs $102_1$-$102_N$ respectively include network interfaces $104_1$-$104_N$, sourcing signalers $106_1$-$106_N$, user interfaces (UIs) $108_1$-$108_N$ UIs $108_1$-$108_N$ respectively include information source indicators $110_1$-$110_N$. In this embodiment, PEs $102_1$-$102_N$ are implemented using conventional, commercially-available personal computers. In other embodiments, other suitable computing devices can be used to implement the PEs. In addition, in this embodiment, PE $102_1$-$102_N$ each include other communication devices such as, for example, telephones, radios, cameras, and/or other audio or video devices, also referred to herein as adjunct devices $112_1$-$112_N$.

Further, in this embodiment, network interfaces $104_1$-$104_N$, sourcing signalers $106_1$-$106_N$, user interfaces (UIs) $108_1$-$108_N$ and information source indicators $110_1$-$110_N$ being implemented as software modules or components executed by computers in the PEs.

Example UI Operation Overview

Figure 2:
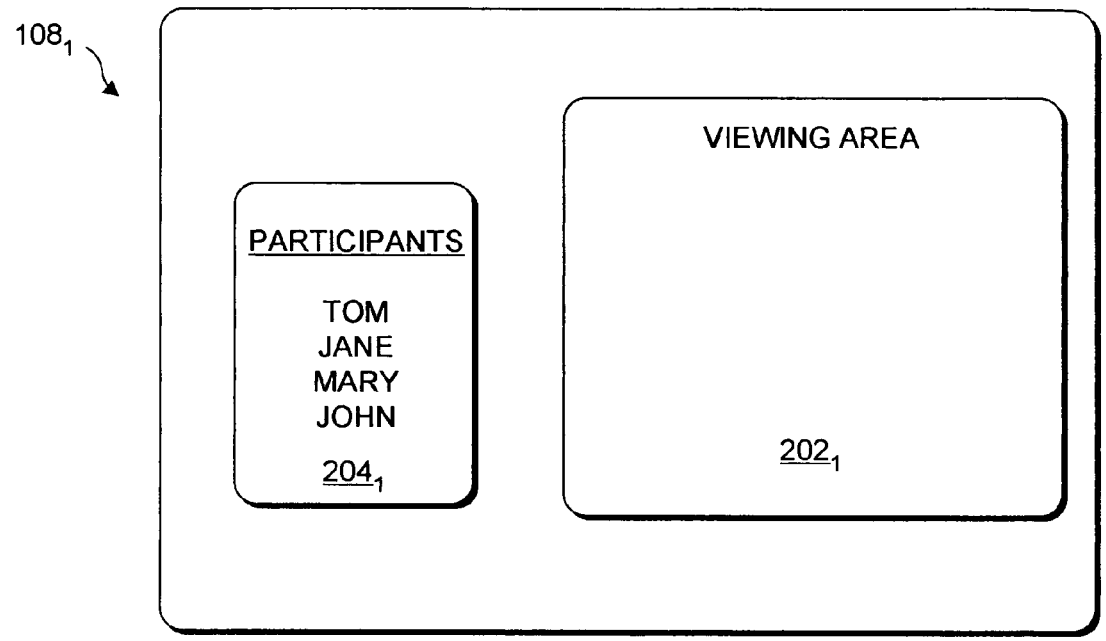
FIGS. 2 and 2A are diagrams illustrating an example user interface (UI) that can indicate when a participant in a multi-party conference is providing information during the multi-party conference, according to one embodiment.

Referring again to FIG. 1, each of PEs $102_1$-$102_N$ is configured to provide, at a real time or near real time basis, an indication of which participant (or participants) is currently providing information during the multi-party conference. This information may be provided via network 101, or through other links using the adjunct devices, or through a combination of network 101 and the adjunct devices. For example, in some embodiments, PEs $102_1$-$102_N$ are used to display visual information (e.g., text, spreadsheet, graphic, video, etc.) via network 101, which the participants may then verbally discuss using adjunct devices such as telephones. In one embodiment, UIs $108_1$-$108_N$ display this visual information in a special viewing area of the UI. For example, FIG. 2 shows a viewing area $202_1$, of UI $108_1$. UI's $108_2$-$108_N$ can have similar viewing areas.

Returning to FIG. 1, information source indicators $110_1$-$110_N$ are also used to display a list of participants via UIs $108_1$-$108_N$. This participant information may be shared among the PEs when the multi-party conference is initiated. For example, each PE may send a participant's name to the PEs of the other participants of the multi-party conference via network 101. In other embodiments, the participant information may be different; e.g., a handle or alias, an icon, an avatar, a photo, a video, or other graphic. Each of UIs $108_1$-$108_N$ can then display the participant information in a special participant list of the UI. For example, FIG. 2 shows a participant list 204, of UI $108_1$. UIs $108_2$-$108_N$ can have similar participant list areas.

Figure 2A:
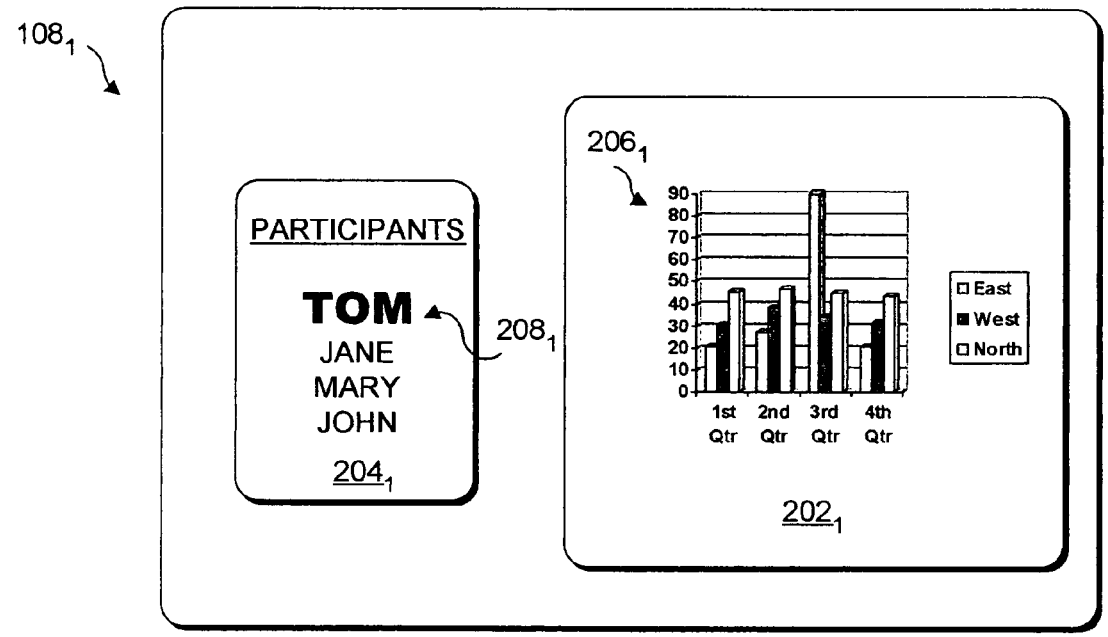

Referring to FIGS. 1 and 2A, information source indicators $110_1$-$110_N$ can cause UIs $108_1$-$108_N$ to display an indication of the participant that is currently providing information during the multi-party conference. For example, a participant named "Tom" is using a PE $102_1$ (which includes a personal computer in this example) to participate in a web conference. As shown in FIG. 2A, PE $102_1$ displays a graphic 206, (e.g., a Microsoft Powerpoint® slide) in viewing area $202_1$. In this example, Tom is discussing the graphic with the other participants via a teleconference (i.e., adjunct $112_1$ is a telephone). Sourcing signaler $106_1$, provides a sourcing signal to UI $108_1$, via internal connection and to PEs $102_2$-$102_N$ via network 101 while Tom is discussing the graphic to indicate that Tom is currently providing information (i.e., is speaking) via the telephone link. Similarly, sourcing signalers $106_2$-$106_N$ provide a sourcing signal whenever their associated participants are providing information. Embodiments for determining when a participant is providing information are described below in conjunction with FIGS. 4-16.

In substantially real time, information source indicators $110_1$-$110_N$ detect the signal and cause UIs $108_1$-$108_N$ to provide an indication that Tom is speaking. For example, in this embodiment UI $108_1$, indicates that Tom is speaking by causing the name "Tom" in participant list $204_1$, to enlarge and become bolder as shown in FIG. 2A. In other embodiments, the name (or graphic, etc.) may flash or blink, change colors, become highlighted, etc. More indications are described in conjunction with FIG. 3 below. Although in this example the information source being indicated is the teleconference audio information, in other embodiments, the source of other types of information may be indicated. For example, the source of the information being displayed in viewing area $202_1$, can be indicated in participant list $204_1$.

Operation of an Example UI in Indicating an Information Source

Figure 3:
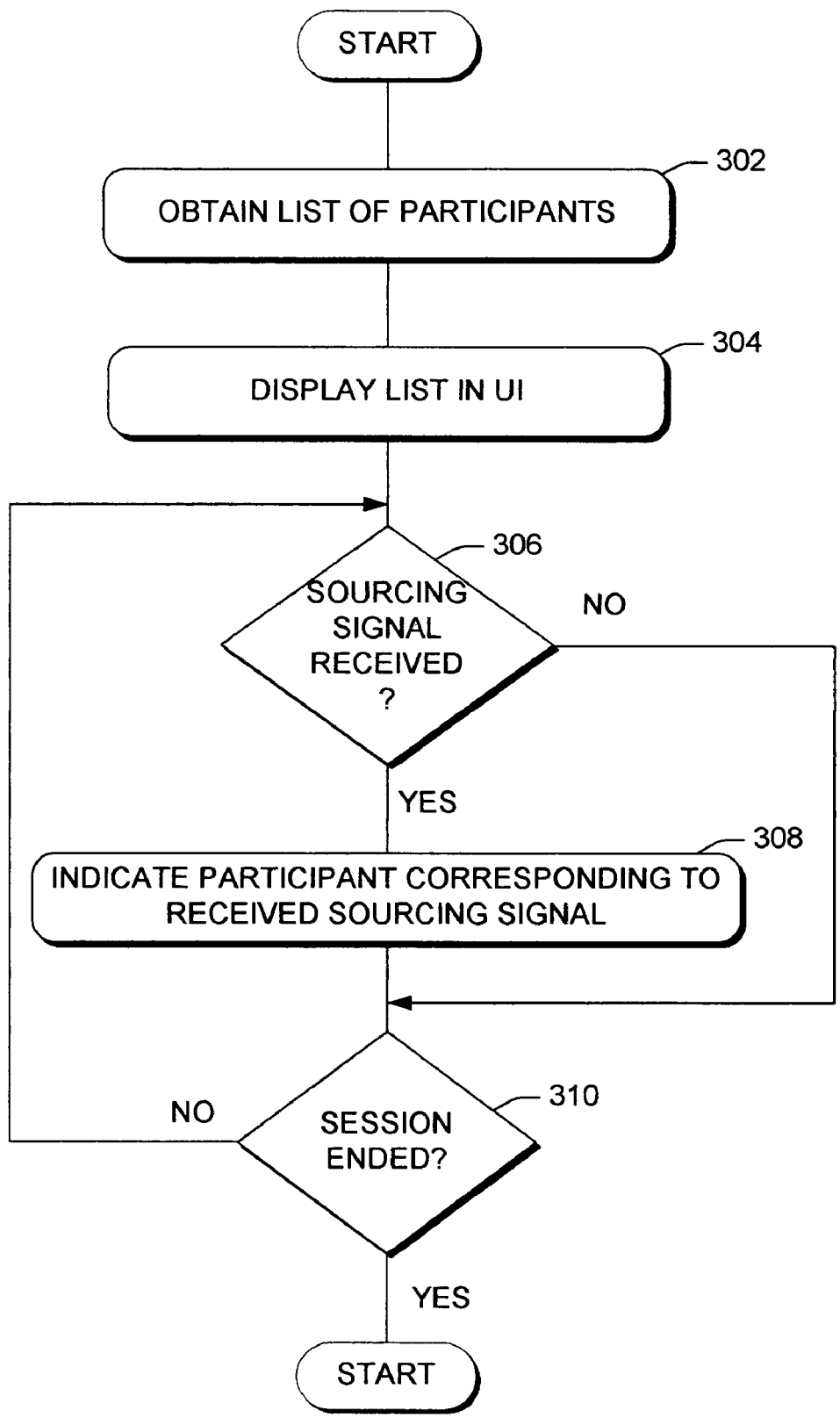
FIG. 3 is a flow diagram illustrating operational flow of the system of FIG. 1, according to one embodiment.

FIG. 3 illustrates operational flow of PEs $102_1$-$102_N$ (FIG. 1) in indicating the source of information during a multi-party conference, according to one embodiment. For clarity, only the operational flow of PE $102_1$ is described, with the operation of PEs $102_2$-$102_N$ being substantially similar.

In a block 302, PE $102_1$ obtains a list of participants in the multiparty conference. As previously described, this list may be in the form of text (e.g., names, aliases, etc.) or in graphical form (e.g., icons, photographs, video, etc.). In one embodiment, PE $102_1$ obtains this list via network 101 (FIG. 1).

In one embodiment, in joining a multi-party conference, each participant provides a name or other identifier to a web-based administrator that coordinates the multi-party conference. This administrator can then provide the names/identifiers to the other participants joining the multi-party conference.

In another embodiment, a participant setting up the multi-party conference can send invitations to other parties using a calendar application (e.g., Microsoft Outlook®), and then add the identifiers of those parties accepting the invitation to the participant list. In some embodiments, the participants are added manually while in others the participants are added automatically when they join the multi-party conference. This embodiment can be used in server-client architecture or a peer-to-peer architecture.

In a block 304, this embodiment of PE $102_1$ displays the list obtained in block 302 in participant list area $204_1$ (FIG. 2). As previously described, the list includes identifiers of the participants, which may be displayed in the form of text, graphics, video, etc. In some embodiments, a participant's PE may be configured to omit displaying that participant's identifier.

In decision block 306, PE $102_1$ determines whether it has received a sourcing signal from one of PEs $102_1$-$102_N$. In one embodiment, one or more of sourcing signalers $106_1$-$106_N$ of PEs $102_1$-$102_N$ can send sourcing signals. As previously described, a PE sends a sourcing signal when its associated participant is providing information during the multi-party conference. In one embodiment, each sourcing signal provides the identifiers of participants providing information to the other participants in the multi-party conference. For example, a sourcing signal can be in the form of a packet sent over network 101, with the packet having a "sourcing" bit set to indicate the sender is providing information to the other participants. In other embodiments, the sourcing signals may have another form. In some embodiments, PE $102_1$ may be configured to omit determining whether it receives a sourcing signal from itself.

In still other embodiments, the sourcing signal may be "de-asserted" to indicate that a participant is no longer providing information during the multi-party conference. For example, when the sourcing signal is a packet, in some embodiments, a subsequent packet may be sent over network 101 with the "sourcing" bit reset when the participant is no longer providing information to the other participants. In another embodiment, a sourcing signal remains "asserted" until a sourcing signal from another participant is received.

In a block 308, if a sourcing signal has been received, PE $102_1$ provides an indication that the participant corresponding to the sourcing signal is providing information. In one embodiment, information source indicator 1101 causes the identifier to indicate that the participant associated with the identifier is providing the information. As previously described, the indication may be causing the identifier to change appearance if the identifier is text (e.g., change font, size, color, become highlighted, bolded, underlined etc.). If the identifier is not text, the indication can be to cause the identifier to have animation (e.g., move, flash, rotate, etc.), or change format type (e.g., change from an icon to a photograph or video, or from a photograph to video, etc.). In yet other embodiments, the indication may be displaying the identifier in a "providing information" area of the UI. Other embodiments include displaying a graphic (e.g., a bullet, an arrow, a star, a speech cloud, etc.) or text (e.g., "speaking", "sourcing") near the identifier. Still another embodiment includes reordering the list of participants so that the participant currently providing information is at a designated position (e.g., at the top of the list). Other types of indications may also be used without departing from the spirit and scope of the present invention.

In a block 310, PE $102_1$ then determines if the multi-party conference is ended. If the multi-part conference is not ended, operational flow returns to block 306. Otherwise, the operational flow terminates.

Overview of Example a PE with Audio Source Discrimination

Figure 4:
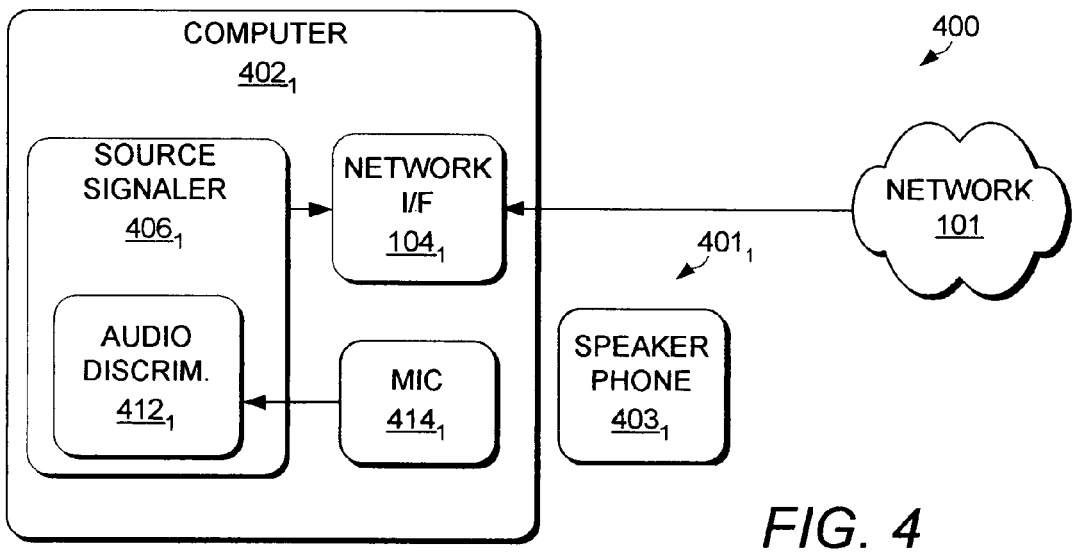
FIG. 4 is a block diagram illustrating a system for source discrimination of an audio signal, according to one embodiment.

FIG. 4 illustrates a system 400 for source discrimination of an acoustic or audio signal, according to one embodiment. The terms acoustic signal and audio signal are used interchangeably herein, and refer to sound waves (i.e., compression waves) propagated in air (or other mediums). In this embodiment, system 400 includes a PE $401_1$, which includes a personal computer $402_1$ and a speakerphone $403_1$ for one participant of a multi-party conference. PE $401_1$, is substantially similar to PE $102_1$ (FIG. 1) in terms of hardware, except that PE $401_1$ includes a microphone (or a connector for an external microphone), whereas embodiments of PE $102_1$ need not have a microphone.

Other participants of the multi-party conference generally also have a PE having a computing device and speakerphone, which are omitted from FIG. 4 for clarity. The other PEs in this example embodiment are substantially similar to that shown in FIG. 4, although in system 400, a participant need not have a speakerphone to participate.

In this embodiment, PE $401_1$ (and other PEs of system 400) are connected to network 101 and can transfer information via network 101 as described above in conjunction with FIGS. 1-3. However, in other embodiments, the audio source discrimination is not limited to multi-party conferencing applications; rather, the audio source discrimination can be used in any suitable application requiring discrimination between a substantially complete spectrum audio signal and a band-limited audio signal.

In this embodiment, computer $402_1$, includes a sourcing signaler $406_1$, having an audio discriminator $412_1$, a microphone interface $414_1$, and previously described network interface $104_1$. In one embodiment, audio discriminator $412_1$, a microphone interface $414_1$, and network interface $104_1$, are implemented as software modules or components executed by computer $402_1$. In addition, in some embodiments, computer $402_1$, can include a UI $108_1$, and sourcing signaler $106_1$, as shown in FIG. 1. This embodiment is advantageously used in multi-party conferencing applications in which participants can communicate with each other via telephone. In such applications, this embodiment of system 400 allows the participants to know which participant is speaking over the telephone.

Further, in this embodiment, audio discriminator $412_1$ is designed to discriminate between speech that is spoken by a participant (also referred to herein as live speech) and speech from a speakerphone (also referred to herein as phone speech) in the presence of noise. Stated another way, in this context, live speech comprises acoustic signals generated by a person (e.g., the participant), whereas phone speech comprises acoustic signals generated by an audio transducer device. Audio discriminator $412_1$ advantageously allows sourcing signaler $406_1$, to distinguish between speech coming from its associated participant and speech coming from speakerphone $403_1$ (i.e., when a different participant is sourcing information). In one embodiment, to discriminate between live and phone speech, audio discriminator $412_1$ detects differences in spectral content between live speech, phone speech, and external noise, which are illustrated below in FIGS. 5A-5C.

Figure 5A:
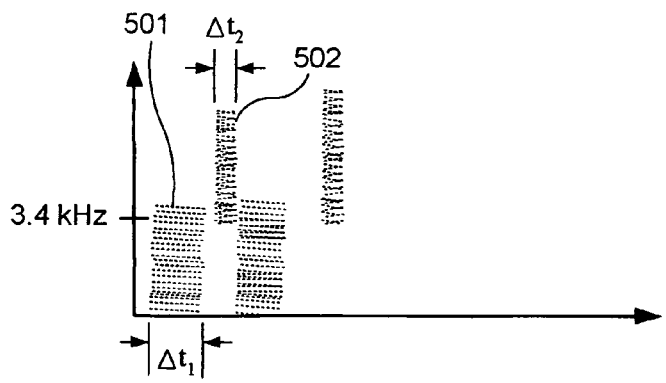
FIGS. 5A-5C are diagrams illustrating spectral information of various audio signals.

FIG. 5A illustrates a simplified example of the frequency range of live speech over time (i.e., a spectrogram). Most of the frequency content of live speech lies within a range of zero to 8 kHz. Thus, after low pass filtering at 8 kHz, a sampling rate of 16 kHz is adequate for live speech. Higher sampling rates can be used to obtain a larger frequency range. Vowels are typically at the lower frequency end of the frequency range (i.e., with most of its spectral range lying below 3.4 kHz. On the other hand, consonants (especially fricatives) are typically at the higher end of the frequency range (i.e., most of its spectral range lying 3.4 kHz). For example, band 501 represents the frequency content over time of a vowel. As shown in FIG. 5A, this example vowel (i.e., band 501) ranges from zero to about 4 kHz with duration indicated as $\Delta t_1$. In contrast, band 502 represents the frequency content over time of a fricative. This example fricative ranges from about 3 kHz to about 8 kHz with duration indicated as $\Delta t_2$. Typically, $\Delta t_1$ is larger than $\Delta t_2$ (i.e. vowels tend to have a larger duration than consonants).

Figure 5B:
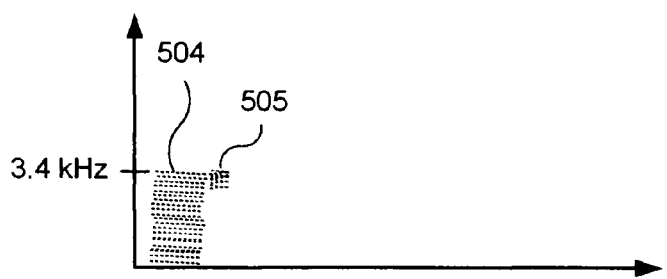

FIG. 5B illustrates a simplified example spectrogram of phone speech. Before transmitting a voice signal over telephone lines, typical U.S. telephone systems low pass filter the voice signal to 3.4 kHz. Thus, most of the energy of a vowel (e.g., band 504) is passed through whereas the energy of a fricative (e.g., band 505) is almost completely filtered out. In addition, the relatively short durations between vowels and consonants and between syllables or words (described above for live speech) are substantially preserved in phone speech. Thus, one embodiment of audio discriminator $412_1$ detects whether the speech has frequency components greater than 3.4 kHz. This embodiment may be practical for applications in which little or no external noise is received along with the speech. However, in a typical environment, external noise will also be received.

Figure 5C:
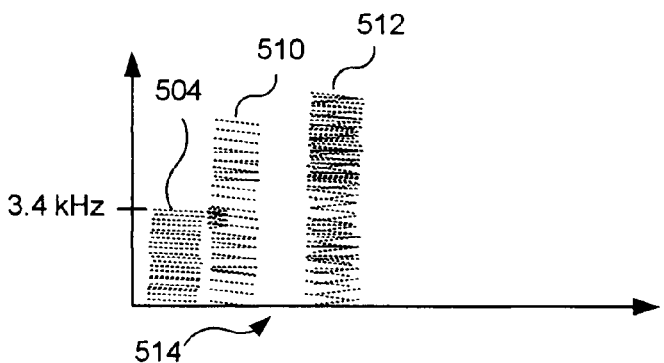

FIG. 5C illustrates a simplified example spectrogram of phone speech in a noisy environment. Band 504 represents a vowel as previously described. Band 510 represents a fricative with noise occurring at the same time. Thus, in this example, band 510 is the combination of band 505 (FIG. 5B) and the band representing the spectral content of the noise. Band 512 represents the spectral content of some other noise. The noise for bands 510 and 512 may come from a variety of sources such as, for example, ruffling papers, typing on a keyboard, fans, bumping or knocking into furniture, etc. Because the noise is generally independent of the speech, the time gaps between noise and speech may be relatively long, as indicated by an arrow 514.

Although "narrow-band" telephone system characteristics are described above in conjunction with FIG. 5B, other embodiments of audio discriminator $412_1$ (FIG. 4) can be designed for use with wide-band telephone systems (which do not limit phone speech to 3.4 kHz). In particular, although supporting a frequency range that is closer to that of live speech, the spectral characteristics of wide-band telephone speech are different from live speech. Thus, in embodiments directed for use in wide-band telephone applications, audio discriminator $412_1$ can be designed to detect the differences in spectral content between live speech, wide-band phone speech, and external noise.

Figure 6:
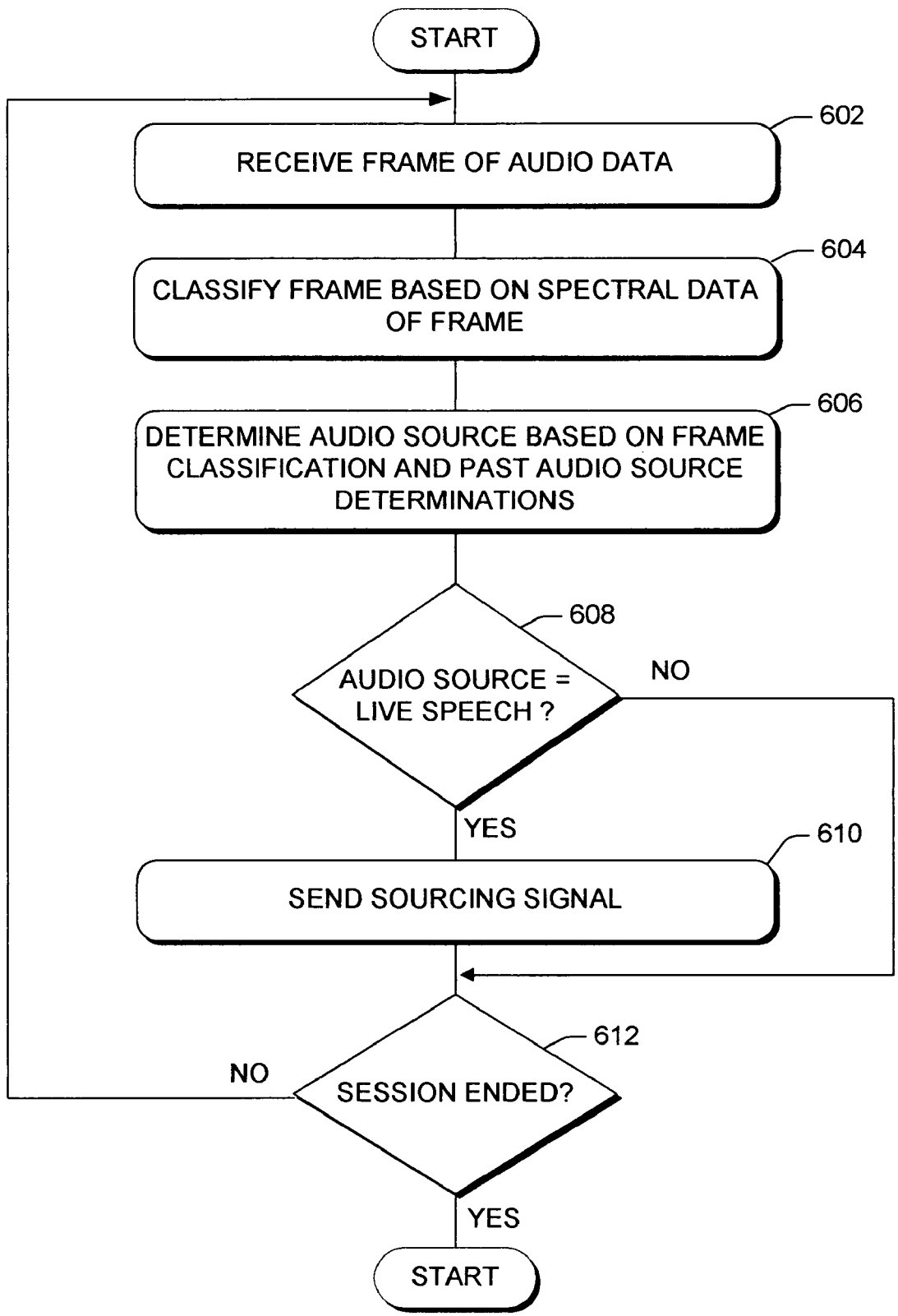
FIG. 6 is a flow diagram illustrating operational flow of the system of FIG. 4, according to one embodiment.

FIG. 6 illustrates operational flow of system 400 (FIG. 4) in sending a sourcing signal, according to one embodiment. This operational flow loops until the multi-party conference terminates. Referring to FIGS. 4-6, this embodiment's operational flow is described below.

In a block 602, computer $402_1$ receives a frame of audio data. In this embodiment, the audio data are samples of audio signals detected by microphone $414_1$, which it then converts to an electrical signal. In one embodiment, audio discriminator $412_1$ samples the electrical signal from microphone $414_1$ at a rate of 16 kHz, although a rate over 16 kHz may be used in other embodiments. A frame, in this embodiment, has 512 samples. In other embodiments, different frame sizes can be used.

In a block 604, this embodiment of audio discriminator $412_1$ classifies the received frame using the frame's spectral data. In one embodiment, audio discriminator $412_1$ processes the flame to obtain the spectral data. Then, this embodiment of audio discriminator $412_1$, in effect, compares the spectral data to the spectrograms of FIGS. 5A-5C to determine whether the frame was taken from live speech or phone speech.

In a block 606, sourcing signaler $406_1$, determines the source of the audio signal based on the frame classification of block 604 and past determinations. In one embodiment, audio discriminator $412_1$ determines whether the source of the audio signal is live speech or phone speech. In other embodiments, sourcing signaler $406_1$, may determine that the source of the audio signal falls into one or more other categories (unknown/not sure, silence, noise, etc.). Block 606 is different from block 604 in that block 604 relates to frame classification rather than determining the source of the audio signal. For example, sourcing signaler $406_1$, may require several frames before it can determine whether the source of an audio signal is live speech or phone speech.

In decision block 608, sourcing signaler $406_1$ checks whether in block 606 the source of the audio signal is live speech. If the source was determined to be live speech, operational flow proceeds to a block 610.

In block 610, sourcing signaler $406_1$, sends a sourcing signal to network 101 as previously described. Then in a decision block 612, sourcing signaler $406_1$, checks whether the multi-party conference has terminated before returning to block 602 to receive another frame of audio data. If the multi-party conference has terminated, operational flow of this aspect of system 400 ends. Similarly, if in block 608 the source of the audio signal was not live speech, operational flow proceeds directly to decision block 612.

Figure 7:
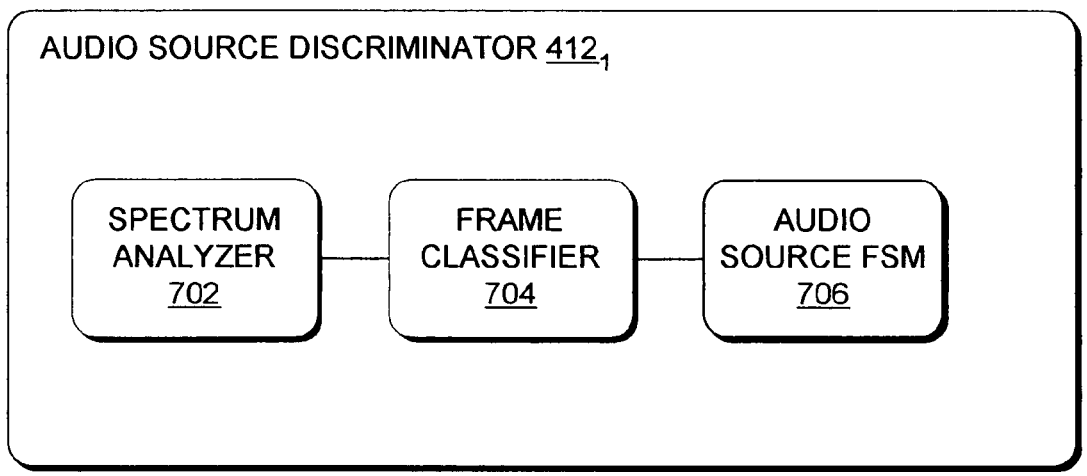
FIG. 7 is a block diagram illustrating an audio source discriminator of FIG. 4, according to one embodiment.

FIG. 7 illustrates an embodiment of audio source discriminator $412_1$ (FIG. 4). In this embodiment, audio source discriminator $412_1$ includes a spectrum analyzer 702, a frame classifier 704, and an audio source finite state machine 706 (also referred to herein as FSM 706). In one embodiment, spectrum analyzer 702, frame classifier 704, and FSM 706 are implemented as software modules or components that can be executed by computer $402_1$, (FIG. 4). Operation of this embodiment of audio source discriminator $412_1$ is described in conjunction with FIG. 8.

Figure 8:
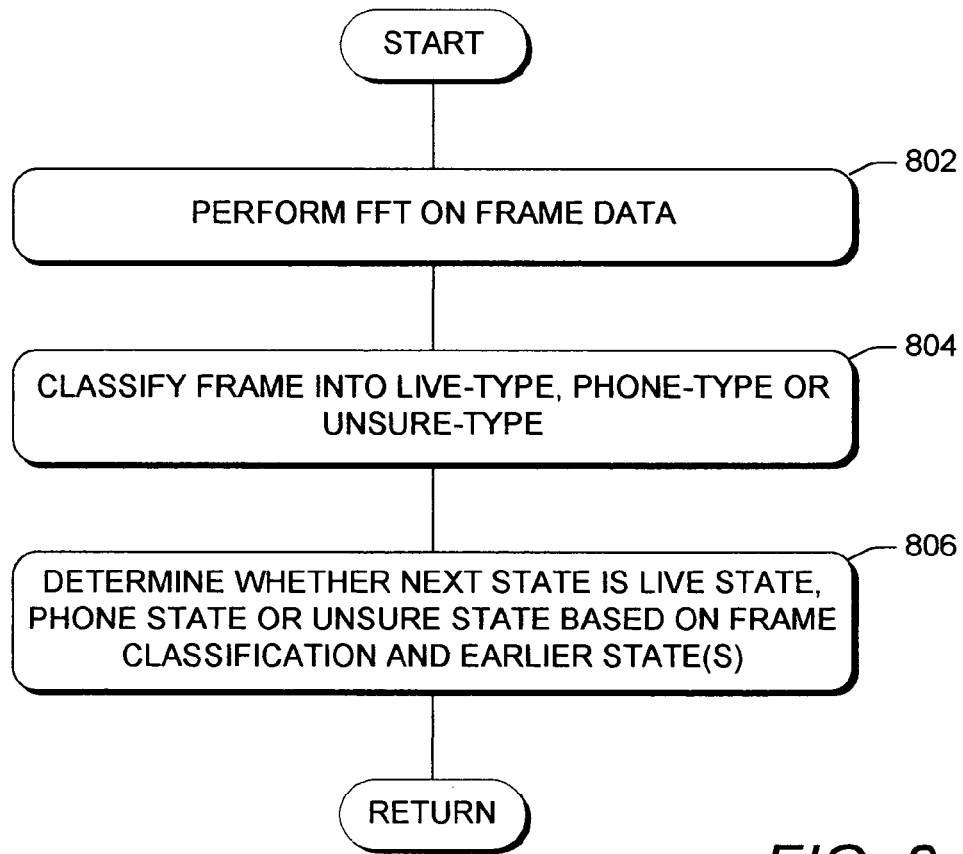
FIG. 8 is a flow diagram illustrating operational flow of the audio source discriminator of FIG. 7, according to one embodiment.

FIG. 8 illustrates operational flow of audio source discriminator $412_1$ (FIG. 7) in determining the source of an audio signal, according to one embodiment. In a block 802, audio source discriminator $412_1$, performs a frequency transform operation on the received frame (see block 602 of FIG. 6) to obtain spectral data of the frame. In this embodiment, spectrum analyzer 702 of audio source discriminator $412_1$ performs an fast Fourier transform (FFT) algorithm to determine the spectrum of the frame in the range of zero to 8 kHz.

In alternative embodiments, audio source discriminator $412_1$ can obtain the spectral data using other techniques. For example, in one embodiment, audio source discriminator $412_1$ uses a modulated complex lapped transform (MCLT) algorithm to determine the spectrum of the audio signal.

In a block 804, audio source discriminator $412_1$ classifies the frame into one of a set of frame types. In one embodiment, frame classifier 704 of audio source discriminator $412_1$ classifies the frame into one of three frame-types; namely, a live-type, a phone-type, or an unsure-type. In other embodiments, the set of frame types may be different. One embodiment of frame classifier 704 is described in more detail below in conjunction with FIGS. 9 and 10.

In a block 806, audio source discriminator $412_1$ determines the next state of FSM 706. In this embodiment, FSM 706 has a phone state, a live state, and an unsure state based on the frame-type of the current frame (see block 804) and the current state of FSM. The next state of FSM 706 defines how audio source discriminator $412_1$ has determined the source of a detected audio signal. Thus, if the next state of FSM 706 is the live state, then audio source discriminator 412₁ has determined that the audio signal source is live speech (i.e., the participant is speaking). But if the next state of FSM 706 is the phone state, then audio source discriminator 412₁ has determined that the audio signal source is speakerphone 403₁ (FIG. 4). Finally, in this embodiment, if the next state of FSM 706 is the unsure state, then audio source discriminator 412₁ cannot determine the source of the audio signal. One embodiment of FSM 706 is described in more detail below in conjunction with FIGS. 12-16.

Although a Moore FSM embodiment is described above, in other embodiments different types of machines or algorithms can be used to determine the source of the audio signal. For example, hidden Markov model (HMM) machine can be used in another embodiment.

Figure 9:
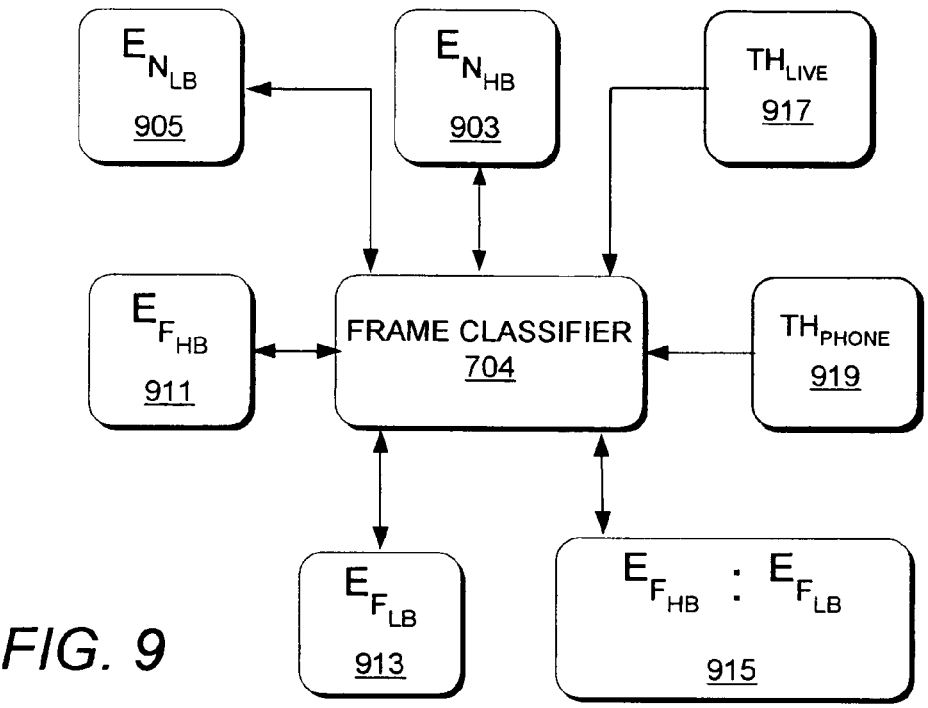
FIG. 9 is a block diagram illustrating parameters generated by and/or used by the frame classifier of FIG. 7, according to one embodiment.

FIG. 9 illustrates parameters generated and/or used by frame classifier 704 (FIG. 7) in classifying frames, according to one embodiment. In this embodiment, frame classifier 704 generates several parameters used in classifying frames from spectral data collected from spectrum analyzer 702 (FIG. 7). The parameters include high band noise floor energy ($E_{N_{HB}}$) 903, low band noise floor energy ($E_{N_{LB}}$) 905, frame high band energy ($E_{F_{HB}}$) 911, frame low band energy ($E_{F_{LB}}$) 913 and a ratio 915 of the frame high band energy to the frame low band energy ($E_{F_{HB}}/E_{F_{LB}}$). In addition, frame classifier 704 uses two more parameters that, in this embodiment, need not be generated from frame spectral data; namely, an energy ratio threshold ($TH_{LIVE}$) 917 for live speech, and an energy ratio threshold ($TH_{PHONE}$) 919 for phone speech. Thresholds $TH_{LIVE}$ 917 and $TH_{PHONE}$ 919 may be predetermined empirically (e.g., using training data). For example, in one embodiment, $TH_{LIVE}$ 917 and $TH_{PHONE}$ 919 are two and twenty, respectively. In other embodiments, other suitable values may be used for $TH_{LIVE}$ 917 and $TH_{PHONE}$ 919.

In one embodiment, the low band is defined as 100 Hz to 3.4 kHz, and the high band is defined as 3.4 kHz to 8 kHz. Other ranges can be used in other embodiments. $E_{N_{HB}}$ 903 and $E_{N_{LB}}$ 905 are dynamically tracked using standard noise floor tracking techniques such as, for example, median-based noise floor tracking (MNFT) techniques. In some embodiments, predetermined default values can be used until a sufficient number of frames have been processed to determine the noise floor values.

Figure 10:
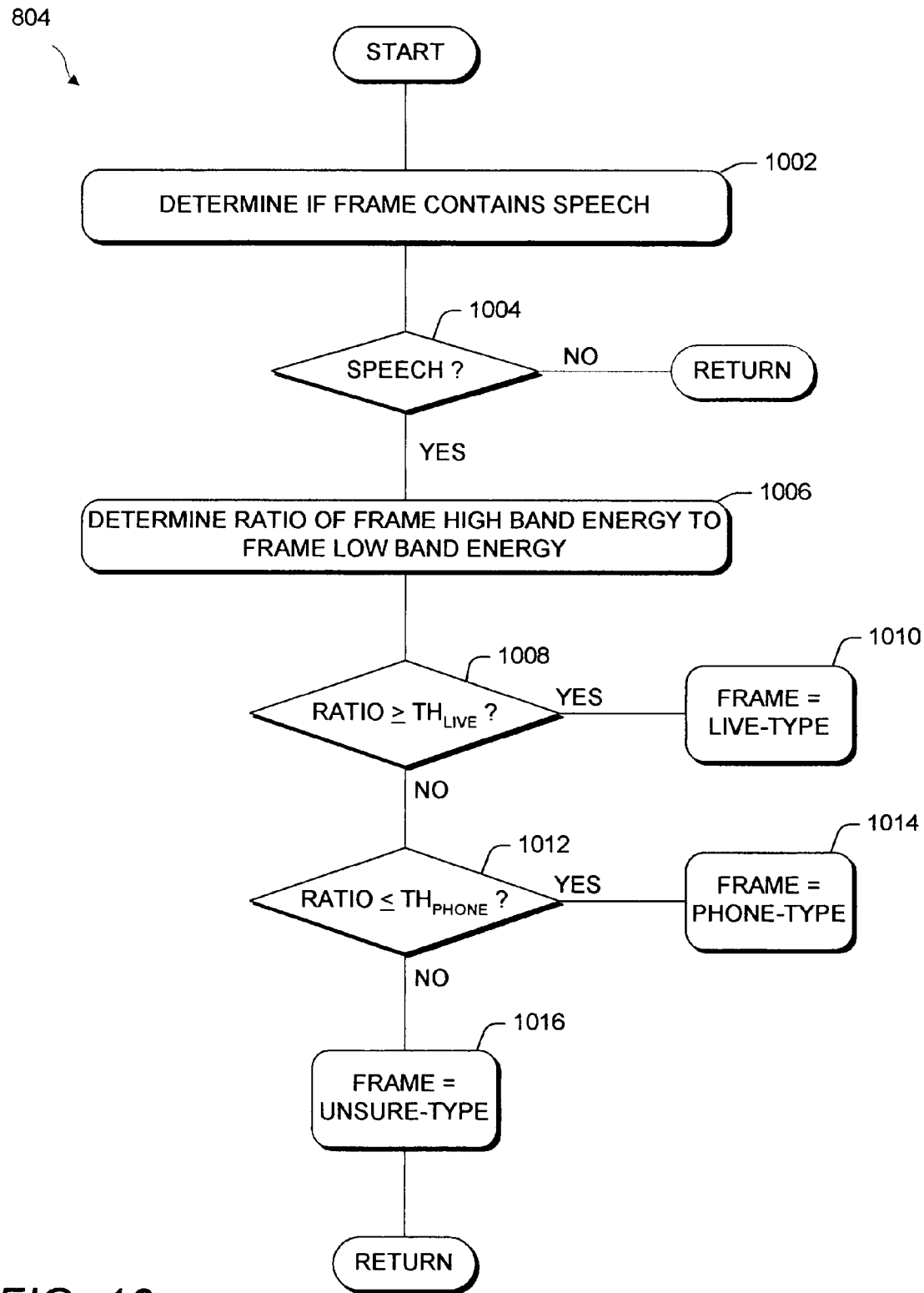
FIG. 10 is a flow diagram illustrating operational flow of the frame classifier of FIG. 7, according to one embodiment.

FIG. 10 illustrates operational flow of frame classifier 704 (FIG. 7), according to one embodiment. In a block 1002, frame classifier 704 determines whether the frame contains possible speech (live speech or phone speech) samples. In one embodiment, frame classifier 704 performs this operation by analyzing the spectral data from spectrum analyzer 702 (FIG. 7).

For example, in one embodiment, frame classifier 704 determines the values of $E_{F_{HB}}$ 911, $E_{F_{LB}}$ 913 and ratio $E_{F_{HB}}/E_{F_{LB}}$ 915 from the frame's spectral data. In this embodiment, if $E_{F_{HB}}$ 911 is greater than $E_{N_{HB}}$ 903, or $E_{F_{LB}}$ 913 is greater than $E_{N_{LB}}$ 905 (i.e., the frame energy is above the noise floor), then the frame is deemed to contain speech.

In a decision block 1004, frame classifier 704 checks whether the frame, as determined in block 1002, contains speech. In not, the frame likely contains data of a silent period and operational flow for processing this frame terminates. This frame can then be used to calculate the noise floors $E_{N_{HB}}$ 903 and $E_{N_{LB}}$ 905. If in block 1002 the frame was deemed to contain speech, the operational flow proceeds to a block 1006.

In block 1006, frame classifier 704 determines ratio 915 from the previously determined values of $E_{F_{HB}}$ 911 and $E_{F_{LB}}$ 913. As previously described, consonants (especially fricatives) of live speech will typically have some high band energy, resulting in ratio 915 being greater than zero. In the case of consonants, ratio 915 will be significantly greater than zero. The operational flow then proceeds to a decision block 1008.

In decision block 1008, frame classifier 704 determines whether ratio 915 is greater than $TH_{LIVE}$ threshold 917. If ratio 915 is greater than $TH_{LIVE}$ threshold 917, then in a block 1010, frame classifier 704 classifies the frame as a live-type frame. If not, the operational flow proceeds to a decision block 1012.

In decision block 1012, frame classifier 704 determines whether ratio 915 is less than $TH_{PHONE}$ threshold 919. As previously described, speech from a speakerphone is band limited to 3.4 kHz, resulting in ratio 915 being equal to or near zero. If ratio 915 is less than $TH_{PHONE}$ threshold 919, then in a block 1014, frame classifier 704 classifies the frame as a phone-type frame. If ratio 915 is greater than $TH_{PHONE}$ threshold 919, then in a block 1016 frame classifier 704 classifies the frame as an unsure-type frame. As previously mentioned, thresholds 917 and 919 can be learned from training data. Frame classifier 704 can then return to block 1002 to classify a next frame.

Figure 11:
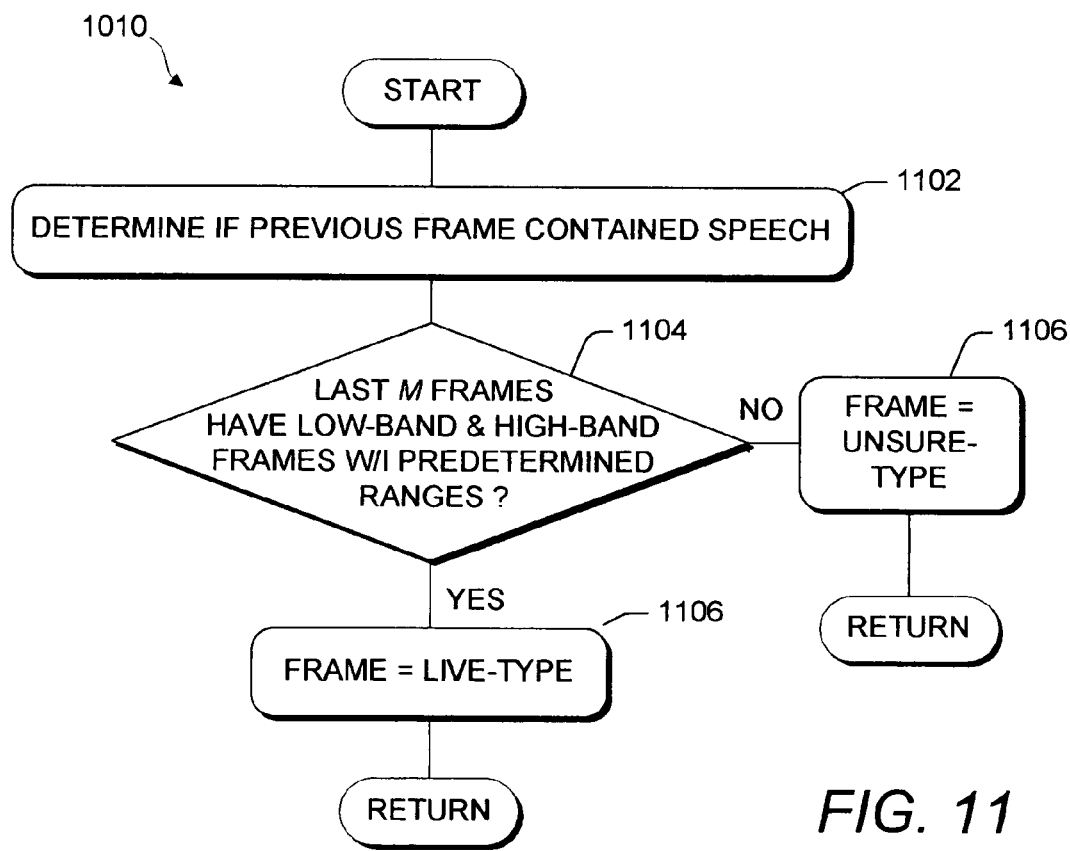
FIG. 11 is a flow diagram illustrating operational flow in determining whether a frame is of live speech, according to an alternative embodiment.
Figure 11A:
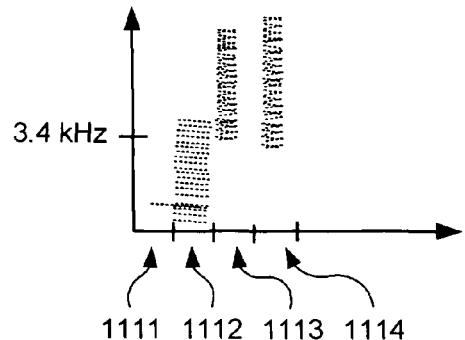
FIGS. 11A and 11B are diagrams illustrating simplified examples of spectrum and timing data of live speech and external noise.
Figure 11B:
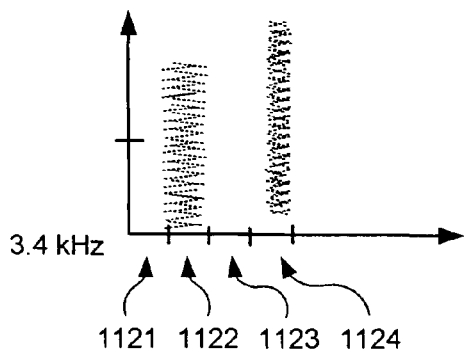

FIG. 11 illustrates operational flow of an alternative embodiment of block 1010 (FIG. 10) in classifying a frame as a live-type frame. In this alternative embodiment, frame classifier 704 (FIG. 7) performs a further processing step before classifying a frame as a live-type frame. FIGS. 11A and 11B illustrate simplified spectrograms of examples of live speech and external noise, respectively.

As previously described, to get to block 1010, ratio 915 has already been determined to be greater than $TH_{LIVE}$ threshold 917. In a block 1102, frame classifier 704 compares the distribution of low-band (i.e., where $E_{F_{HB}}/E_{F_{LB}}$ is near zero) and high-band frames (i.e., where $E_{F_{HB}}/E_{F_{LB}}$ is relatively large) to a predetermined distribution.

In one embodiment, frame classifier 704 compares the distribution of low-band and high band frames in the previous M frames to a distribution of live speech derived from training. In one embodiment, the training is done during the design phase. If the distributions are similar, then it is likely that the current frame is a live speech frame. In one example embodiment, frame classifier 704 is configured to compare the distributions by determining the number of low-band and high-band frames in the previous M frames, and then comparing these numbers to thresholds derived from the training. These thresholds can define a range of the number of low-band frames and a range of the number of high-band frames in the previous M frames. The operational flow then proceeds to a block 1104.

In decision block 1104, if the distributions match, then the operational flow proceeds to a block 1106. Continuing the example embodiment described above, if the numbers of low-band and high-band frames meet the aforementioned ranges, then in block 1106 frame classifier 704 classifies the current frame as a live-type frame. However, if the numbers of low-band and high-band frames do not fall in the ranges, frame classifier 704 classifies the current frame as an unsure-type frame.

In an alternative embodiment, frame classifier 704 can be configured to determine whether the previous frame contained speech (e.g., as determined in block 1002 of FIG. 10 when frame classifier 704 classified the previous frame). In one embodiment, if there is no previous frame (e.g., the current frame is the first frame of the session), then the default determination is that the "previous" frame did not contain speech.

As previously described in conjunction with FIGS. 5A-5C, time gaps between sounds in live speech tend to be relatively short, whereas time gaps between noise and speech may be relatively long. Thus, as shown in the live speech example of FIG. 11A, each of frames 1112-1114 contains speech. However, as shown in the external noise example of FIG. 11B, frames 1122 and 1124 contain "speech" (i.e., spectral data that frame classifier 704 would classify as speech), whereas frames 1121 and 1123 would not be classified as speech.

Thus, if the previous frame contained speech, then frame classifier 704 would classify the current frame as a live-type frame in this alternative embodiment. However, if the previous frame did not contain speech, frame classifier 704 would classify the current frame as an unsure-type frame.

Figure 12:
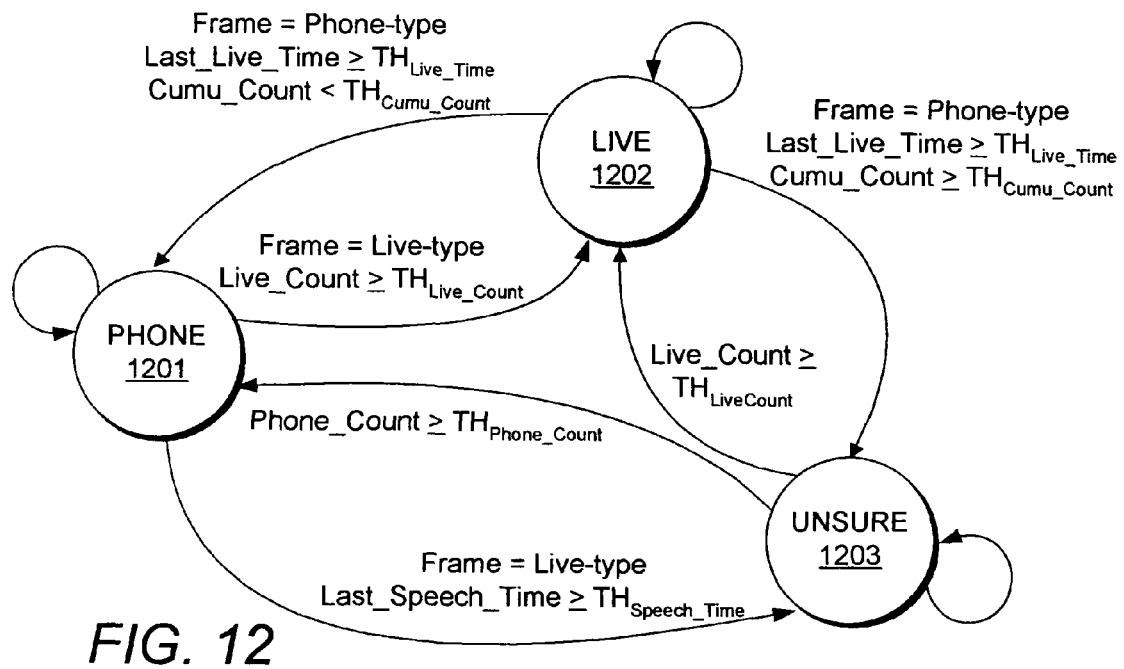
FIG. 12 is a state diagram illustrating the audio source finite state machine (FSM) of FIG. 7, according to one embodiment.
Figure 13:
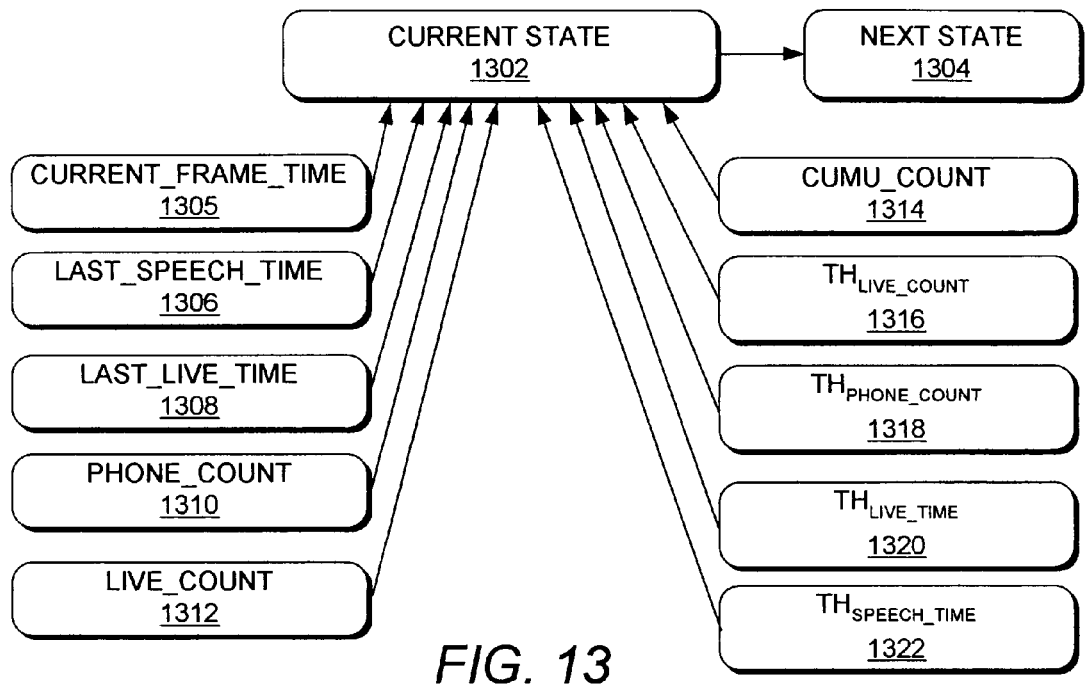
FIG. 13 is a diagram schematically illustrating parameters used by the audio source FSM of FIG. 12 in determining its next state, according to one embodiment.

FIG. 12 illustrates a state diagram of FSM 706 (FIG. 7), according to one embodiment. This embodiment of FSM 706 includes a phone state 1201, a live state 1202, and an unsure state 1203. FIG. 13 schematically illustrates how an embodiment of FSM 704 (FIG. 7) transitions from a current state to a next state as a function of various parameters and thresholds. As shown in FIG. 13, the current state of FSM 706 is represented as current state 1302 and the next state is represented by next state 1304. In this embodiment, FSM 704 generates the following parameters: a Current_Frame_Time 1305; a Last_Speech_Time 1306; a Last_Live_Time 1308; a Phone_Count 1310, a Live_Count 1312, and a Cumu_Count 1314. Threshold parameters include a Live_Count threshold 1316, a Phone_Count threshold 1318, a Last_Live_Time threshold 1320, a Last_Speech_Time threshold 1322, and a Cumu_Count threshold 1324. These thresholds need not be generated by FSM 704 and may be predetermined empirically (e.g., using training data).

Current_Frame_Time 1305 has a value representing the time stamp of the current frame. Last_Speech_Time 1306 has a value that represents the time stamp of the most recent frame classified as either live-type or phone-type. Last_Live_Time 1308 has a value that represents the time stamp of the most recent frame classified as a live-type frame. Phone_Count 1310 has a value representing the number of the last L frames classified as phone-type frames. Live_Count 1312 has a value representing the number of the last L frames classified as live-type frames. Cumu_Count 1314 has a value related to the number of frames since the last live-type frame. For example, in one embodiment, Cumu_Count 1314 when reset has a value of twenty. In this example, if the subsequent frame is a not a live-type frame, Cumu_Count 1314 is decreased by some number, whereas if the subsequent frame is a live-type frame, Cumu_Count 1314 is reset. Referring to FIGS. 12 and 13, FSM 706 transitions from one state to another as follows.

From phone state 1201, FSM 706 can transition to live state 1202 when the current frame has been classified as a live-type frame and parameter Live_Count 1312 is greater than Live_Count threshold 1316. FSM 706 can also transition from phone state 1201 to unsure state 1203 when the current frame has been classified as a live-type frame and parameter Last_Speech_Tine 1306 is greater than Last_Speech_Time threshold 1322. Transitions from phone state 1201 are described further in conjunction with FIG. 14, for one embodiment of FSM 706.

From live state 1202, FSM 706 can transition to phone state 1201 when the current frame has been classified as a phone-type frame and parameter Cumu_Count 1314 is less than Cumu_Count threshold 1324. FSM 706 can also transition from live state 1202 to unsure state 1203 when the current frame has been classified as a phone-type frame, parameter Cumu_Count 1314 is greater than Cumu_Count threshold 1324, and parameter Last_Live_Time 1308 is greater than Last_Live_Time threshold 1320. Transitions from live state 1202 are described further in conjunction with FIG. 15, for one embodiment of FSM 706.

From unsure state 1203, FSM 706 can transition to phone state 1201 when parameter Phone_Count 1310 is greater than Phone_Count threshold 1318. FSM 706 can transition from unsure state 1203 to live state 1202 when parameter Live_Count 1312 is less than Live_Count threshold 1316. Transitions from unsure state 1203 are described further in conjunction with FIG. 16, for one embodiment of FSM 706.

Figure 14:
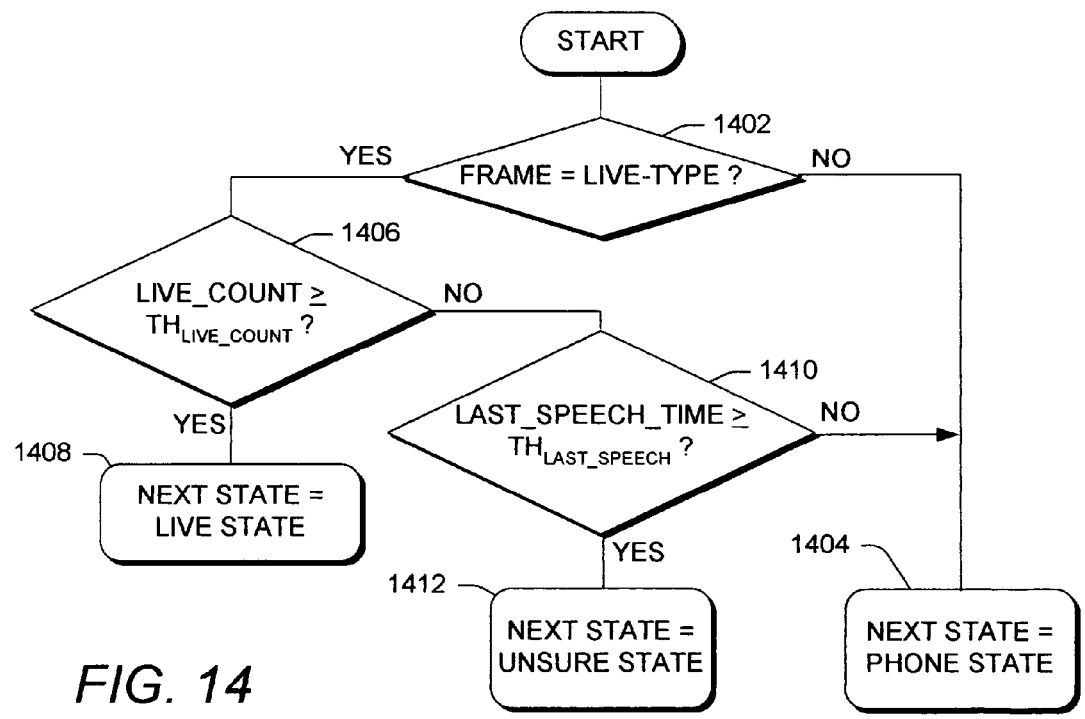
FIG. 14 is a flow diagram illustrating operational flow in the audio source FSM of FIG. 12 in determining its next state from the phone state.

FIG. 14 illustrates operational flow of FSM 706 (FIG. 7) in determining its next state from phone state 1201, according to one embodiment. Referring to FIGS. 12-14, FSM 706 operates as follows in determining its next state from phone state 1201.

Starting with FSM 706 having a current state 1302 of phone state 1201, in a block 1402, FSM 706 determines whether the current frame is a live-type frame. In this embodiment, FSM 706 gets this information from previously described frame classifier 704 (FIG. 7). If the frame type is not a live-type frame, the operational flow proceeds to a block 1404 in which FSM 706 causes the next state 1304 to be phone state 1201 (i.e., there is no state transition in FSM 706).

However, if in block 1402 FSM 704 finds that the current frame is a live-frame type, in a block 1406 FSM 706 compares parameter Live_Count 1312 with Live_Count threshold 1316. If Live_Count 1312 is greater than or equal to Live_Count threshold 1316, in a block 1408 FSM 706 causes next state 1304 to be live state 1202. The rationale for this operation is that FMS 706 will wait for a certain number of live-type frames before transitioning from phone state 1201 to live state 1202 to help ensure that the speech is really live speech and not phone speech combined with external noise.

On the other hand, if Live_Count 1312 is less than Live_Count threshold 1316 in block 1406, in a decision block 1410, FSM 706 determines whether parameter Last_Speech_Time 1306 is greater than Last_Speech_Time threshold 1322. If Last_Speech_Time 1306 is greater than or equal to Last_Speech_Time threshold 1322, then FSM 706 causes next state 1304 to be unsure state 1203 in a block 1412. The rationale for this operation is that because the last speech (either live speech or phone speech) occurred a relatively long time ago, FSM 706 and "suddenly" a live-type frame is received, it is no longer clear what kind of speech is being detected.

However, if in block 1410 Last_Speech_Time 1306 is less than Last_Speech_Time threshold 1322, FSM 706 causes next state 1304 to be phone state 1201 (i.e., proceeds to block 1404). The rationale for this operation is that because the last speech (either live speech or phone speech) occurred a relatively short time ago, the current live-type frame is probably really speech; however, because not enough live-type frames have occurred (i.e., block 1406), FSM 704 remains in phone state 1201.

Figure 15:
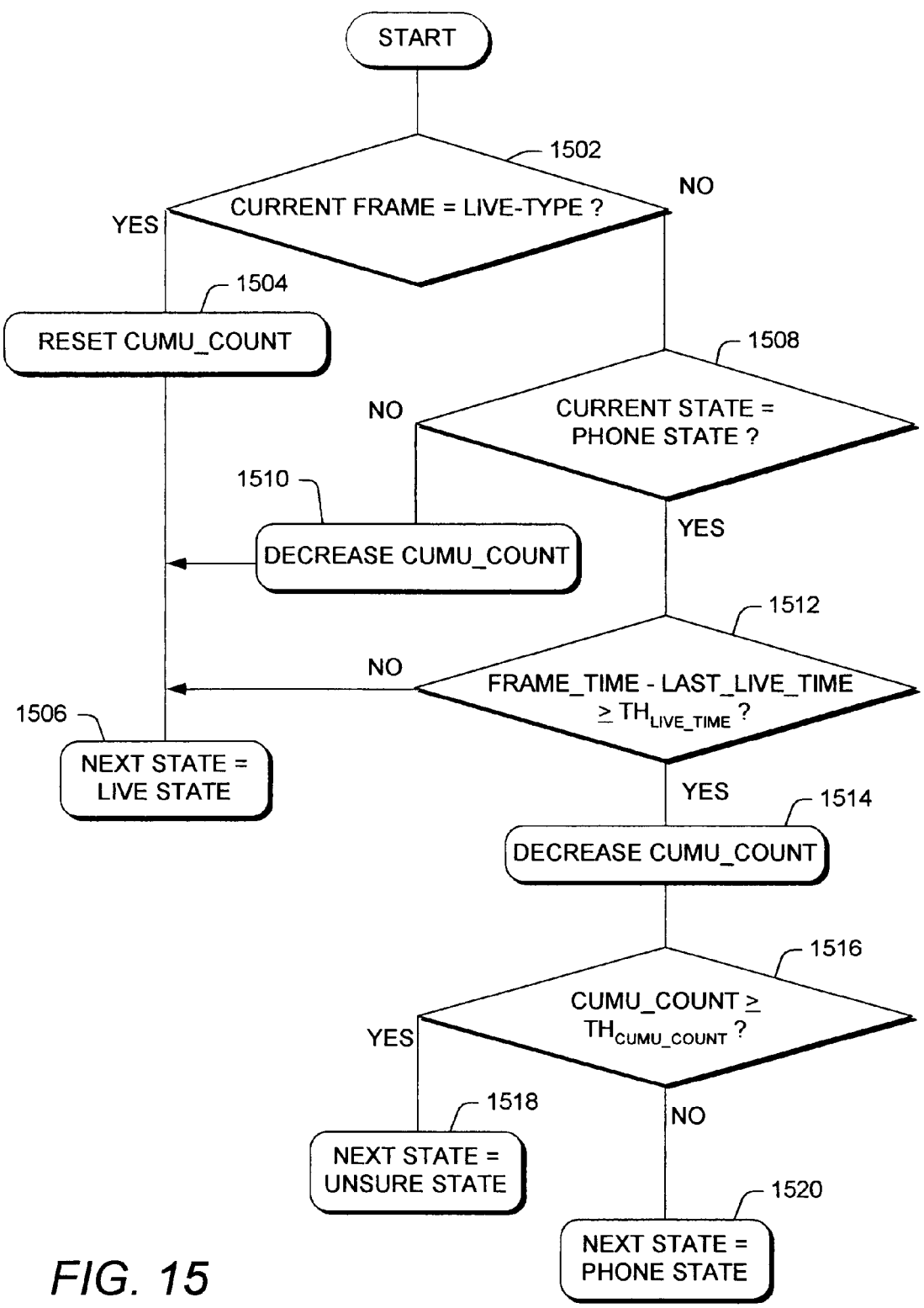
FIG. 15 is a flow diagram illustrating operational flow in the audio source FSM of FIG. 12 in determining its next state from the live state.

FIG. 15 illustrates operational flow of FSM 706 (FIG. 7) in determining its next state 1304 (FIG. 13) from live state 1202, according to one embodiment. Referring to FIGS. 12, 13 and 15, FSM 706 operates as follows in determining its next state from live state 1202.

Starting with FSM 706 having a current state 1302 of live state 1202, in a block 1502, FSM 706 determines whether the current frame is a live-type frame. In this embodiment, FSM 706 gets this information from previously described frame classifier 704 (FIG. 7). If the frame type is a live-type frame, the operational flow proceeds to a block 1504 in which FSM 706 resets parameter Cumu_Count 1314. Then in a block

1506, FSM 706 causes the next state 1304 to be live state 1202 (i.e., there is no state transition in FSM 706).

However, if in block 1502 the current frame is not a live-type frame, FSM 706 determines whether the current frame is a phone-type frame in a decision block 1508. If the current frame is not a phone-type frame, FSM 706 decreases parameter Cumu_Count 1314 in a block 1510. This operation, in effect, allows Cumu_Count to keep track of a "confidence level" of the most recent live-type frame. That is, because the current frame is neither a live-type frame nor a phone-type frame, the confidence in the classification of the most recent live-type frame's classification should be reduced.

From block 1510, the operational flow proceeds to block 1506, in which FSM 706 again causes next state 1304 to be live state 1202. The rationale for this operation is that even though the current frame is neither a live-type nor phone-type frame, because the current state is live state 1202, the participant is likely to still be speaking. For example, the frame could have been taken from a period of silence between words, or at a point in which some out-of-phase noise happened to cancel out some of the live speech. In such a case, next state 1304 should be the same as current state 1302 (i.e., remain in live state 1202). However, if in block 1508 the current frame is a phone-type frame, the operational flow proceeds to a decision block 1512.

In decision block 1512, FSM 706 determines whether the difference between parameters Current_Frame_Time 1305 and Last_Live_Time 1308 is greater than or equal to Last_Live_Time threshold 1320. If not (i.e., the time since the last live-type frame was relatively recent), operational flow proceeds to block 1506. The rationale for this operation is that if the time since the last live-type frame is relatively recent, then it could be that current frame was really a live-type frame that was mistakenly classified as a phone type frame (e.g. the frame contained a vowel). In this case, next state 1304 should be the same as current state 1302 (i.e., remain in live state 1202).

However, if in decision block 1512, the difference between parameters Current_Frame_Time 1305 and Last_Live_Time 1308 is greater than or equal to Last_Live_Time threshold 1320 (i.e., the time since the last live-type frame was relatively long ago), FSM 706 decreases parameter Cumu_Count 1314 in a block 1514. In one embodiment, FSM 706 decreases Cumu_Count at a faster rate than in block 1510. The rationale of this operation is that because the current frame was classified as a phone type frame and the most recent live-type frame occurred a relatively long time ago, there should be less confidence that the most recent live-type frame was correctly classified.

In a decision block 1516, FSM 706 then determines whether parameter Cumu_Count 1314 is greater than or equal to Cumu_Count threshold 1324. In one embodiment, Cumu_Count threshold 1324 is set to zero. If Cumu_Count 1314 is greater than or equal to Cumu_Count threshold 1324, then the operational flow proceeds to a block 1518. In block 1518, FSM 706 causes next state 1304 to be in unsure state 1203. In this case, there is some confidence that the most recent live-type frame was correctly classified as live-speech, but because the last live-type frame was long ago, FSM 706 can no longer be sure that next state 1204 should be live state 1202.

However, if in block 1516 Cumu_Count 1314 is less than Cumu_Count threshold 1324, then FSM 706 in a block 1520 causes next state 1304 to be in phone state 1201. Because there is, in effect, no confidence that the most recent live-type frame (which occurred a relatively long time ago) was correctly classified as live-type, FSM 706 treats the current frame (i.e., phone-type) as the correct frame type. Thus, FSM causes next state 1304 to be phone state 1201.

Figure 16:
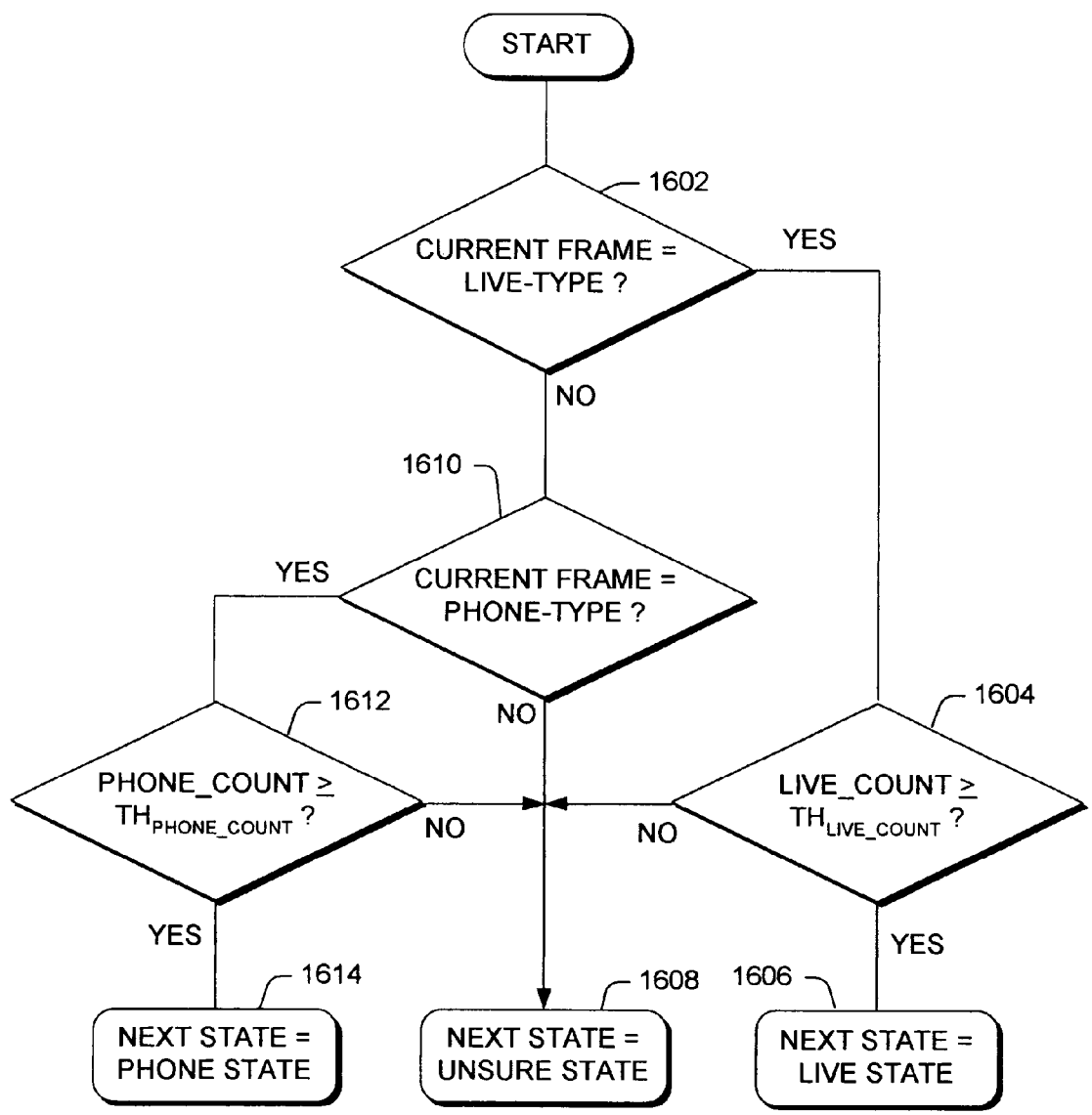
FIG. 16 is a flow diagram illustrating operational flow in the audio source FSM of FIG. 12 in determining its next state from the unsure state.

FIG. 16 illustrates operational flow in FSM 706 (FIG. 7) in determining its next state 1304 (FIG. 13) from unsure state 1203 (FIG. 12). Referring to FIGS. 12, 13 and 16, FSM 706 operates as follows in determining its next state from unsure state 1203.

Starting with FSM 706 having a current state 1302 of unsure state 1203, in a block 1602, FSM 706 determines whether the current frame is a live-type frame. In this embodiment, FSM 706 gets this information from previously described frame classifier 704 (FIG. 7). If the frame type is a live-type frame, the operational flow proceeds to a decision block 1604 in which FSM 706 determines whether parameter Live_Count 1312 is greater than or equal to Live_Count threshold 1316.

If in decision block 1604 Live_Count 1312 is greater than or equal to Live_Count threshold 1316, the operational flow proceeds to a block 1606. In block 1606, then FSM 706 causes next state 1304 to be in live state 1202. This operation reflects the fact that including the current frame, there are enough live-type frames in the last K frames to be confident that live speech is really being detected.

However, if in decision block 1604 Live_Count 1312 is less than Live_Count threshold 1316, the operational flow proceeds to a block 1608. In block 1608, FSM 706 causes next state 1304 to be in unsure state 1203. This operation reflects the fact that there have not been enough live-type frames to transition to live state 1202 from unsure state 1203.

Referring back to decision block 1602, if the current frame is not a live-type frame, the operational flow proceeds to a decision block 1610. In decision block 1610, FSM 706 determines whether the current frame is a phone-type frame. If the current frame is not a phone-type frame, the operational flow proceeds to block 1608. In this embodiment, if the current frame is neither a live-type frame nor a phone-type frame, then it is an unsure-type frame. Thus, if the current state is unsure state 1203 and the current frame is an unsure-type frame, then next state 1304 should also be the unsure state.

However, if in decision block 1610 the current frame is a phone-type frame, the operational flow proceeds to a decision block 1612. In decision block 1612, FSM 706 determines whether parameter Phone_Count 1310 is greater than or equal to Phone_Count threshold 1318.

If in decision block 1612 Phone_Count 1310 is greater than or equal to Phone_Count threshold 1318, the operational flow proceeds to a block 1614. In block 1614, then FSM 706 causes next state 1304 to be in phone state 1201. This operation reflects the fact that including the current frame, there are enough phone-type frames in the last K frames to be confident that phone speech is really being detected.

However, if in decision block 1612 Phone_Count 1310 is not greater than or equal to Phone_Count threshold 1318, the operational flow proceeds to block 1608. As previously described, block 1608 causes next state 1304 to be in unsure state 1203. This operation reflects the fact that there have not been enough phone-type frames to transition to phone state 1201 from unsure state 1203.

Figure 17:
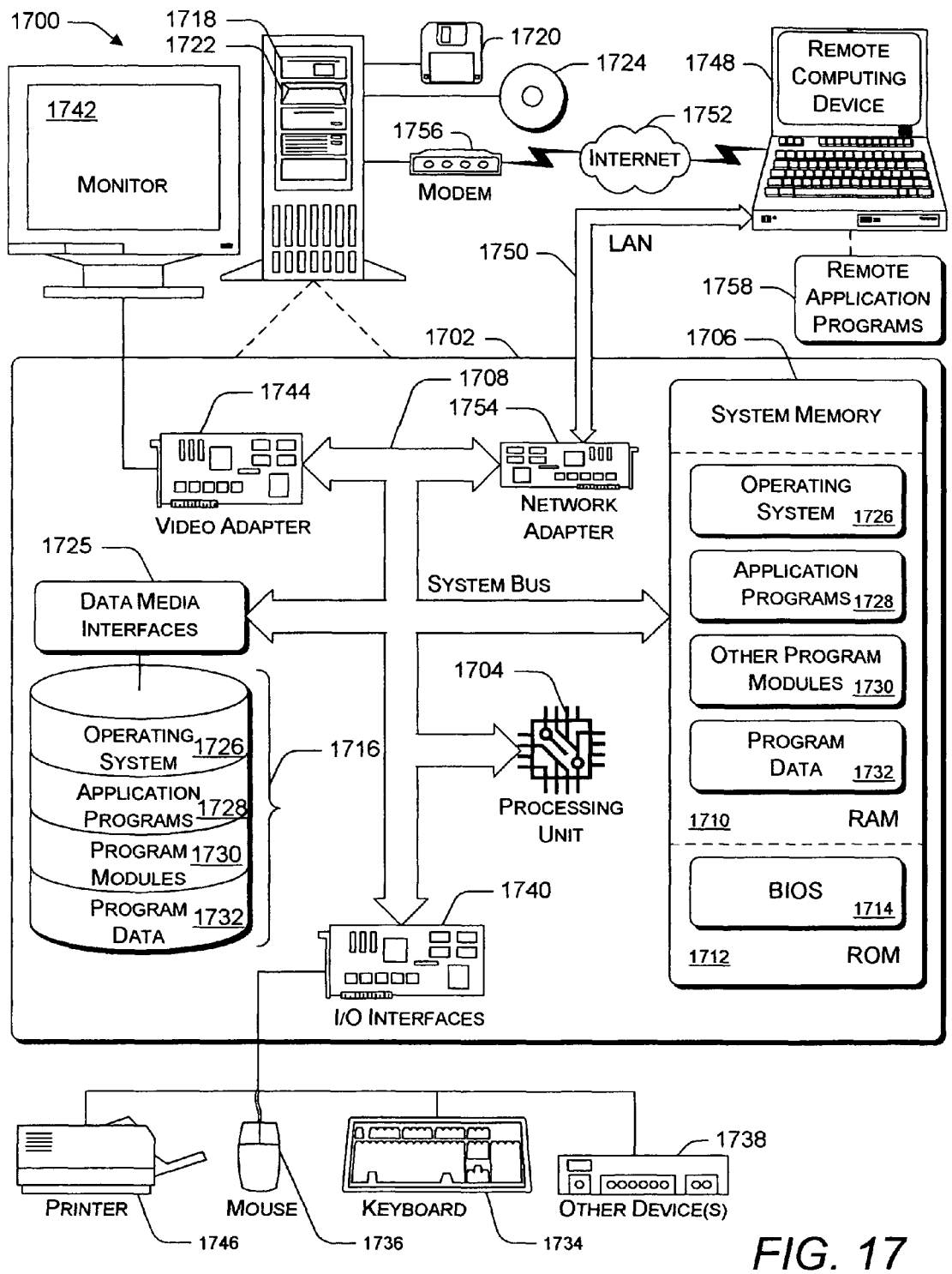
FIG. 17 is a block diagram illustrating an example computing environment suitable for practicing the above embodiments.

FIG. 17 illustrates a general computer environment 1700, which can be used to implement the techniques described herein. The computer environment 1700 is only one example of a computing environment and is not intended to suggest any limitation as to the scope of use or functionality of the computer and network architectures. Neither should the computer environment 1700 be interpreted as having any dependency or requirement relating to any one or combination of components illustrated in the example computer environment 1700.

Computer environment 1700 includes a general-purpose computing device in the form of a computer 1702. The components of computer 1702 can include, but are not limited to, one or more processors or processing units 1704, system memory 1706, and system bus 1708 that couples various system components including processor 1704 to system memory 1706.

System bus 1708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 1702 may include a variety of computer-readable media. Such media can be any available media that is accessible by computer 1702 and includes both volatile and non-volatile media, removable and non-removable media.

System memory 1706 includes computer-readable media in the form of volatile memory, such as random access memory (RAM) 1710; and/or non-volatile memory, such as read only memory (ROM) 1712 or flash RAM. Basic input/output system (BIOS) 1714, containing the basic routines that help to transfer information between elements within computer 1702, such as during start-up, is stored in ROM 1712 or flash RAM. RAM 1710 typically contains data and/or program modules that are immediately accessible to and/or presently operated on by processing unit 1704.

Computer 1702 may also include other removable/non-removable, volatile/non-volatile computer storage media. By way of example, FIG. 17 illustrates hard disk drive 1716 for reading from and writing to a non-removable, non-volatile magnetic media (not shown), magnetic disk drive 1718 for reading from and writing to removable, non-volatile magnetic disk 1720 (e.g., a "floppy disk"), and optical disk drive 1722 for reading from and/or writing to a removable, non-volatile optical disk 1724 such as a CD-ROM, DVD-ROM, or other optical media. Hard disk drive 1716, magnetic disk drive 1718, and optical disk drive 1722 are each connected to system bus 1708 by one or more data media interfaces 1725. Alternatively, hard disk drive 1716, magnetic disk drive 1718, and optical disk drive 1722 can be connected to the system bus 1708 by one or more interfaces (not shown).

The disk drives and their associated computer-readable media provide non-volatile storage of computer-readable instructions, data structures, program modules, and other data for computer 1702. Although the example illustrates a hard disk 1716, removable magnetic disk 1720, and removable optical disk 1724, it is appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1716, magnetic disk 1720, optical disk 1724, ROM 1712, and/or RAM 1710, including by way of example, operating system 1726, one or more application programs 1728, other program modules 1730, and program data 1732. Each of such operating system 1726, one or more application programs 1728, other program modules 1730, and program data 1732 (or some combination thereof) may implement all or part of the resident components that support the distributed file system.

A user can enter commands and information into computer 1702 via input devices such as keyboard 1734 and a pointing device 1736 (e.g., a "mouse"). Other input devices 1738 (not shown specifically) may include a microphone, joystick, game pad, satellite dish, serial port, scanner, and/or the like. These and other input devices are connected to processing unit 1704 via input/output interfaces 1740 that are coupled to system bus 1708, but may be connected by other interface and bus structures, such as a parallel port, game port, or a universal serial bus (USB).

Monitor 1742 or other type of display device can also be connected to the system bus 1708 via an interface, such as video adapter 1744. In addition to monitor 1742, other output peripheral devices can include components such as speakers (not shown) and printer 1746, which can be connected to computer 1702 via I/O interfaces 1740.

Computer 1702 can operate in a networked environment using logical connections to one or more remote computers, such as remote computing device 1748. By way of example, remote computing device 1748 can be a PC, portable computer, a server, a router, a network computer, a peer device or other common network node, and the like. Remote computing device 1748 is illustrated as a portable computer that can include many or all of the elements and features described herein relative to computer 1702. Alternatively, computer 1702 can operate in a non-networked environment as well.

Logical connections between computer 1702 and remote computer 1748 are depicted as a local area network (LAN) 1750 and a general wide area network (WAN) 1752. Such networking environments are commonplace in offices, enterprise-wide computer networks, intranets, and the Internet.

When implemented in a LAN networking environment, computer 1702 is connected to local network 1750 via network interface or adapter 1754. When implemented in a WAN networking environment, computer 1702 typically includes modem 1756 or other means for establishing communications over wide network 1752. Modem 1756, which can be internal or external to computer 1702, can be connected to system bus 1708 via I/O interfaces 1740 or other appropriate mechanisms. It is to be appreciated that the illustrated network connections are examples and that other means of establishing at least one communication link between computers 1702 and 1748 can be employed.

In a networked environment, such as that illustrated with computing environment 1700, program modules depicted relative to computer 1702, or portions thereof, may be stored in a remote memory storage device. By way of example, remote application programs 1758 reside on a memory device of remote computer 1748. For purposes of illustration, applications or programs and other executable program components such as the operating system are illustrated herein as discrete blocks, although it is recognized that such programs and components reside at various times in different storage components of computer 1702, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer-readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method, comprising:
   via a first participant equipment:
      detecting an acoustic signal;
      determining whether the detected acoustic signal was generated by a person speaking by receiving a frame of audio data derived from the detected acoustic signal;
      classifying the received frame based on spectral data of the received frame, the spectral data obtained by performing a modulated complex lapped transform (MOLT) on the frame of audio data, the classifying comprising classifying the received frame as one of the plurality of predetermined frame types comprising a live-type frame, a phone-type frame, and an unsure-type frame, wherein live-type frames represent frames determined to be derived from acoustic signals generated by a person speaking, and phone-type frames represent frames determined to be derived from acoustic signals generated by an audio transducer device; and
      providing a signal indicating to a second participant equipment that the detected acoustic signal was generated by the person.

2. The method of claim 1, wherein determining whether the detected acoustic signal was generated by a person further comprises:
   determining whether the detected acoustic signal was speech from an audio transducer device.

3. The method of claim 1, wherein the signal is transmitted over a network to participants of a multi-party conference.

4. The method of claim 1 wherein determining whether the detected acoustic signal was generated by a person further comprises:
   determining a source of a portion of the detected acoustic signal used to derive the frame based on the classification of the frame and a prior determination of a source of a detected acoustic signal portion.

5. The method of claim 4, wherein the spectral data is obtained by performing a frequency transform on the frame of audio data.

6. The method of claim 5, wherein the spectral data is obtained by performing a fast Fourier transform (FFT) on the frame of audio data.

7. The method of claim 4, further comprising determining a first frequency band's energy and a second frequency band's energy from the spectral data.

8. The method of claim 7, wherein the first frequency band corresponds to a frequency range for consonants and the second frequency band corresponds to a frequency range for vowels.

9. The method of claim 8, further comprising classifying the frame as being generated by a person when the ratio of the energies of the first and second frequency bands exceeds a first predetermined threshold.

10. The method of claim 9, further comprising selectively classifying the frame as being from a different source when the ratio of the energies of the first and second frequency bands is below a second predetermined threshold.

11. The method of claim 10, further comprising selectively classifying the frame as having an unknown source when the ratio of the energies of the first and second frequency bands exceeds the second predetermined threshold and is below the first predetermined threshold, the second predetermined threshold being less than the first predetermined threshold.

12. The method of claim 8, further comprising determining whether the frame was derived from speech, wherein speech includes acoustic signals generated by a person speaking and acoustic signals generated by an audio transducer device.

13. The method of claim 12, further comprising determining noise floor energies of the first and second frequency bands using the spectral data, wherein a frame is selectively classified as being derived from speech in response to the energy of the first frequency band exceeding the noise floor energy of the first frequency band or the energy of the second frequency band exceeding the noise floor of the second frequency band, or both.

14. The method of claim 13, wherein classifying the received frame further comprises:
   determining whether a frame received within a predetermined number of frames relative to the received frame has substantially all of its energy in the second frequency band.

15. The method of claim 13, wherein classifying the received frame further comprises:
   determining whether a frame adjacent to the received frame was classified as derived from speech.

16. The method of claim 1, further comprising determining the source of the detected acoustic signal to be an acoustic signal generated by a person, if:
   the prior determination of a source of a detected acoustic signal portion is that the source was an audio transducer device;
   the frame is classified as a live-type frame; and
   a predetermined number of prior frames includes live-type frames that exceed a predetermined live-type frame count threshold.

17. The method of claim 1, further comprising determining the source of the detected acoustic signal to be unsure, if:
   the prior determination of a source of a detected acoustic signal portion is that the source was an audio transducer device;
   the frame is classified as a live-type frame;
   a predetermined number of most recent frames do not include enough live-type frames to exceed a predetermined threshold; and
   an elapsed time since receiving a previous frame derived from speech exceeds a predetermined first time threshold.

18. The method of claim 1, further comprising determining the source of the detected acoustic signal to be an audio transducer device, if:
   the prior determination of a source of a detected acoustic signal portion is that the source was an acoustic signal generated by a person speaking;
   the frame is classified as a phone-type frame;
   an elapsed time since receiving a previous live-type frame exceeds a predetermined second time threshold; and
   a counter value does not exceed a predetermined count threshold, the counter value to track a number of consecutive non-live-type frames received after receiving a live-type frame of most recent frames do not include enough live-type frames to exceed a predetermined threshold.

19. The method of claim 1, further comprising determining the source of the detected acoustic signal to be unsure, if:
   the prior determination of a source of a detected acoustic signal portion is that the source was an acoustic signal generated by a person speaking;
   the frame is classified as a phone-type frame;
   an elapsed time since receiving a previous live-type frame exceeds a predetermined second time threshold; and
   the counter value is below a predetermined count threshold, the counter value to track a number of consecutive non-live-type frames received after receiving a live-type frame of most recent frames do not include enough live-type frames to exceed a predetermined threshold.

20. The method of claim 1, further comprising determining the source of the detected acoustic signal to be an acoustic signal generated by a person speaking, if:
   the prior determination of a source of a detected acoustic signal portion is unsure;
   the frame is classified as a live-type frame; and
   a predetermined number of most recent prior frames includes live-type frames that exceed in number a predetermined live-type frame count threshold.

21. The method of claim 1, further comprising determining the source of the detected acoustic signal to be an acoustic transducer device, if:
   the prior determination of a source of a detected acoustic signal portion is unsure;
   the frame is classified as a phone-type frame; and
   a predetermined number of most recent prior frames includes phone-type frames that exceed in number a predetermined phone-type frame count threshold.

22. A computer-readable tangible medium having computer-executable instructions that, upon execution, facilitate a computing device in performing operations comprising:
   detecting an acoustic signal;
   determining whether the detected acoustic signal was generated by a person speaking by receiving a frame of audio data derived from the detected acoustic signal;
   determining a source of the detected acoustic signal to be unsure, if:
      a prior determination of the source of the detected acoustic signal is that the source of the detected acoustic signal was an audio transducer device;
      the frame of audio data is classified as a live-type frame;
      a predetermined number of most recent frames do not include enough live-type frames to exceed a predetermined live-type frame count threshold; and
      an elapsed time since receiving a previous frame derived from speech exceeds a predetermined first time threshold; or
      the prior determination of the source of the detected acoustic signal is that the source was the acoustic signal generated by a person speaking;
      the frame of audio data is classified as a phone-type frame;
      an elapsed time since receiving a previous live-type frame exceeds a predetermined second time threshold; and
      a counter value is below a predetermined count threshold, the counter value to track a number of consecutive non-live-type frames received after receiving the live-type frame of most recent frames does not include enough live-type frames to exceed the predetermined count threshold;
   determining the source of the detected acoustic signal to be the acoustic signal generated by the person speaking, if:
      the prior determination of a source of a detected acoustic signal is unsure;
      the frame of audio data is classified as the live-type frame; and
      the predetermined number of most recent prior frames includes live-type frames that exceed in number the predetermined live-type frame count threshold;
   determining the source of the detected acoustic signal to be the audio transducer device, if:
      the prior determination of the source of the detected acoustic signal is unsure;
      the frame of audio data is classified as the phone-type frame; and
      the predetermined number of most recent prior frames includes phone-type frames that exceed in number a predetermined phone-type frame count threshold;

classifying the received frame of audio data based on spectral data of the received frame of audio data, the classifying comprising classifying the received frame of audio data as one of a plurality of predetermined frame types comprising the live-type frame; the phone-type frame; and an unsure-type frame, wherein live-type frames represent frames determined to be derived from acoustic signals generated by the person speaking, and phone-type frames represent frames determined to be derived from acoustic signals generated by the audio transducer device, wherein parameters used to classify frames include high band noise floor energy, low band noise floor energy, frame high band energy, frame low band energy, a ratio of the frame high band energy to the frame low band energy;

classifying the received frame of audio data from non-spectral data of the received frame based on a parameters energy ratio threshold for live speech and an energy ratio for phone speech; and providing a signal indicating to a second computing device that the detected acoustic signal was generated by a person.

23. The computer-readable tangible medium of claim 22, wherein determining whether the detected acoustic signal was generated by a person further comprises:
determining whether the detected acoustic signal was speech from an audio transducer device.

24. The computer-readable tangible medium of claim 22, wherein the signal is transmitted over a network to participants of a multi-party conference.

25. The computer-readable tangible medium of claim 22, wherein determining whether the detected acoustic signal was generated by a person further comprises:
determining a source of a portion of the detected acoustic signal used to derive the frame based on the classification of the frame and a prior determination of a source of a detected acoustic signal portion.

26. The computer-readable tangible medium of claim 25, wherein the spectral data is obtained by performing a frequency transform on the frame of audio data.

27. The computer-readable tangible medium of claim 25, wherein the operations further comprise determining a first frequency band's energy and a second frequency band's energy from the spectral data.

28. The computer-readable tangible medium of claim 27, wherein the first frequency band corresponds to a frequency range for consonants and the second frequency band corresponds to a frequency range for vowels.

29. The computer-readable tangible medium of claim 28, wherein the operations further comprise:
classifying the frame as being generated by a person when the ratio of the energies of the first and second frequency bands exceeds a first predetermined threshold.

30. The computer-readable tangible medium of claim 29, wherein the operations further comprise:
selectively classifying the frame as being from another source when the ratio of the energies of the first and second frequency bands is below a second predetermined threshold.

31. The computer-readable tangible medium of claim 30, wherein the operations further comprise:
selectively classifying the frame as having an unknown source when the ratio of the energies of the first and second frequency bands exceeds the second predetermined threshold and is below the first predetermined threshold, the second predetermined threshold being less than the first predetermined threshold.

32. The computer-readable tangible medium of claim 28, wherein the operations further comprise:
determining whether the frame was derived from speech, wherein speech includes acoustic signals generated by a person speaking and acoustic signals generated by an audio transducer device.

33. The computer-readable tangible medium of claim 32, wherein the operations further comprise:
determining noise floor energies of the first and second frequency bands using the spectral data, wherein a frame is selectively classified as being derived from speech in response to the energy of the first frequency band exceeding the noise floor energy of the first frequency band or the energy of the second frequency band exceeding the noise floor of the second frequency band, or both.

34. The computer-readable tangible medium of claim 33, wherein classifying the received frame further comprises:
determining whether a frame adjacent to the received frame was classified as derived from speech.

35. The computer-readable tangible medium of claim 33, wherein classifying the received frame further comprises:
determining whether a frame within a predetermined number of frames relative to the received frame has substantially all of its energy in the second frequency band.

36. The computer-readable tangible medium of claim 22, wherein the operations further comprise determining the source of the detected acoustic signal to be an acoustic signal generated by a person, if:
the prior determination of a source of a detected acoustic signal portion is that the source was an audio transducer device;
the frame is classified as a live-type frame; and
a predetermined number of prior frames includes live-type frames that exceed a predetermined live-type frame count threshold.

37. The computer-readable tangible medium of claim 22, wherein the operations further comprise determining the source of the detected acoustic signal to be an audio transducer device, if:
the prior determination of a source of a detected acoustic signal portion is that the source was an acoustic signal generated by a person speaking;
the frame is classified as a phone-type frame;
an elapsed time since receiving a previous live-type frame exceeds a predetermined second time threshold; and
a counter value does not exceed a predetermined count threshold, the counter value to track a number of consecutive non-live-type frames received after receiving a live-type frame of most recent frames do not include enough live-type frames to exceed a predetermined threshold.

* * * * *